US009049629B2

(12) United States Patent
Ahmavaara et al.

(10) Patent No.: US 9,049,629 B2
(45) Date of Patent: Jun. 2, 2015

(54) METHOD AND APPARATUS FOR FAST INTER-SYSTEM HANDOVER

(75) Inventors: Kalle I. Ahmavaara, San Diego, CA (US); Lorenzo Casaccia, Rome (IT); George Tsirtsis, London (GB); Wolfgang Granzow, Heroldsberg (DE)

(73) Assignee: QUALCOMM Incorporated, San Diego, CA (US)

( * ) Notice: Subject to any disclaimer, the term of this patent is extended or adjusted under 35 U.S.C. 154(b) by 1604 days.

(21) Appl. No.: 12/140,623

(22) Filed: Jun. 17, 2008

(65) Prior Publication Data

US 2009/0016300 A1  Jan. 15, 2009

Related U.S. Application Data

(60) Provisional application No. 60/944,782, filed on Jun. 18, 2007.

(51) Int. Cl.
*H04W 4/00* (2009.01)
*H04B 7/216* (2006.01)
*H04W 36/00* (2009.01)
*H04W 92/04* (2009.01)

(52) U.S. Cl.
CPC ...... *H04W 36/0072* (2013.01); *H04W 36/0066* (2013.01); *H04W 92/045* (2013.01)

(58) Field of Classification Search
CPC .......................... H04W 80/04; H04W 36/0072
USPC .......................................................... 370/331
See application file for complete search history.

(56) References Cited

U.S. PATENT DOCUMENTS

| 6,154,652 | A * | 11/2000 | Park et al. ...................... 455/437 |
| 6,859,654 | B1 * | 2/2005 | Reynolds et al. ............. 455/437 |
| 6,909,899 | B2 | 6/2005 | Wang et al. |
| 7,046,647 | B2 | 5/2006 | Oba et al. |

(Continued)

FOREIGN PATENT DOCUMENTS

| CA | 2679270 A1 | 9/2008 |
| CN | 1505413 A | 6/2004 |

(Continued)

OTHER PUBLICATIONS

Hyun-Ho Choi et al., "A seamless handoff scheme for UMTS-WLAN interworking," Global Telecommunications Conference, 2004. Globecom '04. IEEE Dallas, TZ, Nov. 29-Dec. 3, 2004. vol. 3, Nov. 29, 2004, pp. 1559-1564.

(Continued)

*Primary Examiner* — Guang Li

(57) ABSTRACT

Systems and methodologies are described that facilitate inter-system handover in a wireless communication system. Various aspects described herein provide for handover techniques that enable a target system to be prepared by a mobile device via a source system in order to minimize specific changes required to source system and/or target system. Techniques are described herein in which the radio link of a source system can be utilized to tunnel signaling messages which are in a format understood by a destination node in a target system. Further, fast inter-access handover can be facilitated by establishing a simple generic transmission tunnel between respective network nodes in source and target systems that handle intra-system mobility and providing a Layer 2 (L2) tunneling mechanism over the radio interface of each involved system technology.

26 Claims, 17 Drawing Sheets

(56) References Cited

U.S. PATENT DOCUMENTS

| | | | |
|---|---|---|---|
| 7,079,511 B2 | 7/2006 | Abrol et al. | |
| 7,206,579 B2* | 4/2007 | Gwon et al. | 455/436 |
| 7,586,876 B2* | 9/2009 | Chung et al. | 370/331 |
| 7,697,523 B2 | 4/2010 | Leung et al. | |
| 7,916,715 B2 | 3/2011 | Rezaiifar et al. | |
| 7,933,245 B2* | 4/2011 | Carlton | 370/331 |
| 7,961,683 B2* | 6/2011 | Das et al. | 370/331 |
| 7,978,683 B2 | 7/2011 | Balogh et al. | |
| 8,036,176 B2* | 10/2011 | Oba et al. | 370/331 |
| 8,072,942 B2 | 12/2011 | Gaal et al. | |
| 8,145,217 B2 | 3/2012 | Wang et al. | |
| 8,150,397 B2* | 4/2012 | Khetawat et al. | 455/436 |
| 8,243,680 B2* | 8/2012 | Jung et al. | 370/331 |
| 8,359,033 B2* | 1/2013 | Diachina et al. | 455/436 |
| 8,457,063 B2* | 6/2013 | Wu et al. | 370/330 |
| 8,526,952 B2* | 9/2013 | Shaheen | 455/436 |
| 8,538,430 B1 | 9/2013 | Filiatrault et al. | |
| 8,576,795 B2 | 11/2013 | Ulupinar et al. | |
| 8,638,749 B2 | 1/2014 | Cherian et al. | |
| 2002/0136226 A1 | 9/2002 | Christoffel et al. | |
| 2002/0194385 A1 | 12/2002 | Linder et al. | |
| 2002/0196753 A1* | 12/2002 | Famolari | 370/335 |
| 2003/0104814 A1 | 6/2003 | Gwon et al. | |
| 2003/0125027 A1 | 7/2003 | Gwon et al. | |
| 2004/0008632 A1 | 1/2004 | Hsu et al. | |
| 2004/0117508 A1* | 6/2004 | Shimizu | 709/249 |
| 2004/0125795 A1 | 7/2004 | Corson et al. | |
| 2004/0156329 A1* | 8/2004 | Bck et al. | 370/328 |
| 2004/0203787 A1 | 10/2004 | Naghian | |
| 2005/0143072 A1 | 6/2005 | Yoon et al. | |
| 2005/0186948 A1* | 8/2005 | Gallagher et al. | 455/414.1 |
| 2005/0272432 A1 | 12/2005 | Ji et al. | |
| 2006/0018280 A1* | 1/2006 | Kumar et al. | 370/331 |
| 2006/0023683 A1* | 2/2006 | Lee et al. | 370/338 |
| 2006/0046728 A1 | 3/2006 | Jung et al. | |
| 2006/0050667 A1* | 3/2006 | Verma et al. | 370/338 |
| 2006/0099949 A1 | 5/2006 | Jung et al. | |
| 2006/0114871 A1 | 6/2006 | Buckley et al. | |
| 2006/0126565 A1 | 6/2006 | Shaheen | |
| 2006/0140150 A1 | 6/2006 | Olvera-Hernandez et al. | |
| 2006/0148475 A1 | 7/2006 | Spear et al. | |
| 2006/0203774 A1* | 9/2006 | Carrion-Rodrigo | 370/331 |
| 2007/0036109 A1* | 2/2007 | Kwak et al. | 370/331 |
| 2007/0160049 A1 | 7/2007 | Xie et al. | |
| 2007/0165574 A1 | 7/2007 | Srey et al. | |
| 2007/0177585 A1 | 8/2007 | El Mghazli et al. | |
| 2007/0213060 A1* | 9/2007 | Shaheen | 455/436 |
| 2007/0249352 A1 | 10/2007 | Song et al. | |
| 2007/0254625 A1 | 11/2007 | Edge | |
| 2007/0258399 A1 | 11/2007 | Chen | |
| 2008/0031159 A1* | 2/2008 | Jokinen | 370/255 |
| 2008/0076420 A1* | 3/2008 | Khetawat et al. | 455/435.1 |
| 2008/0089272 A1 | 4/2008 | Ahokangas | |
| 2008/0089287 A1 | 4/2008 | Sagfors et al. | |
| 2008/0092224 A1 | 4/2008 | Coulas et al. | |
| 2008/0153495 A1 | 6/2008 | Ogami et al. | |
| 2008/0165740 A1 | 7/2008 | Bachmann et al. | |
| 2008/0242303 A1* | 10/2008 | Takahashi et al. | 455/436 |
| 2008/0259869 A1* | 10/2008 | Wang et al. | 370/331 |
| 2008/0281978 A1 | 11/2008 | Tang et al. | |
| 2008/0305796 A1* | 12/2008 | Dolan | 455/436 |
| 2009/0040981 A1 | 2/2009 | Agashe et al. | |
| 2009/0042576 A1* | 2/2009 | Mukherjee et al. | 455/436 |
| 2009/0111468 A1 | 4/2009 | Burgess et al. | |
| 2009/0176489 A1 | 7/2009 | Ulupinar et al. | |
| 2009/0186612 A1* | 7/2009 | Aghili | 455/432.1 |
| 2009/0201878 A1* | 8/2009 | Kotecha et al. | 370/331 |
| 2009/0202966 A1 | 8/2009 | Teicher et al. | |
| 2009/0257402 A1* | 10/2009 | Zhu et al. | 370/331 |
| 2009/0258631 A1 | 10/2009 | Forsberg et al. | |
| 2009/0271623 A1 | 10/2009 | Forsberg et al. | |
| 2009/0286527 A1 | 11/2009 | Cheon et al. | |
| 2010/0054207 A1* | 3/2010 | Gupta et al. | 370/331 |
| 2010/0061340 A1 | 3/2010 | Ramle et al. | |
| 2010/0190500 A1 | 7/2010 | Choi et al. | |
| 2011/0044198 A1 | 2/2011 | Persson et al. | |
| 2011/0292914 A1* | 12/2011 | Sachs et al. | 370/332 |
| 2014/0092870 A1 | 4/2014 | Ulupinar et al. | |
| 2014/0295853 A1 | 10/2014 | Ulupinar et al. | |

FOREIGN PATENT DOCUMENTS

| | | | |
|---|---|---|---|
| CN | 1756237 A | | 4/2006 |
| EP | 1441483 A2 | | 7/2004 |
| EP | 1509052 A1 | | 2/2005 |
| EP | 1746856 A1 | | 1/2007 |
| JP | 2006518122 A | | 8/2006 |
| JP | 2008503108 A | | 1/2008 |
| JP | 2008507875 A | | 3/2008 |
| JP | 2008519568 A | | 6/2008 |
| JP | 2010534999 A | | 11/2010 |
| KR | 20060124397 A | | 12/2006 |
| KR | 20070046012 A | | 5/2007 |
| KR | 101042763 B1 | | 6/2011 |
| RU | 2237381 | | 9/2004 |
| RU | 2004137498 A | | 6/2005 |
| RU | 2260919 C2 | | 9/2005 |
| RU | 2265282 C2 | | 11/2005 |
| RU | 2006106706 | | 9/2006 |
| TW | M294789 U | | 4/2006 |
| WO | WO-0031946 A2 | | 6/2000 |
| WO | WO-0247407 A2 | | 6/2002 |
| WO | WO-03030460 A2 | | 4/2003 |
| WO | WO2004075576 A1 | | 9/2004 |
| WO | WO-2005036804 A2 | | 4/2005 |
| WO | WO-2005055481 A1 | | 6/2005 |
| WO | WO-2005125256 A1 | | 12/2005 |
| WO | WO-2006011053 A1 | | 2/2006 |
| WO | WO-2006049464 A1 | | 5/2006 |
| WO | WO-2006052563 A2 | | 5/2006 |
| WO | WO-06083039 | | 8/2006 |
| WO | WO-2006102650 A1 | | 9/2006 |
| WO | 2006118489 A1 | | 11/2006 |
| WO | 2007007990 | | 1/2007 |
| WO | WO 2007007990 A1 * | | 1/2007 |
| WO | WO-08115757 | | 9/2008 |
| WO | WO-2009002586 A2 | | 12/2008 |
| WO | WO-2009012191 A2 | | 1/2009 |
| WO | WO-2009037623 A2 | | 3/2009 |
| WO | WO-2009154640 A2 | | 12/2009 |

OTHER PUBLICATIONS

QUALCOMM EUROPE, "Information flows for handover between 3GPP and non-3GPP accesses," 3GPP TSG SA WG2 Architecture—S2#56c Ad-hoc, S2-071148, Mar. 26-30, 2007, Warsaw. Poland, pp. 1-3.

International Search Report—PCT/US08/067387, International Search Authority—European.Patent Office. Jan. 22, 2009.

Written Opinion—PCT/US08/067387, International Search Authority—European Patent Office, Jan. 22, 2009.

Partial International Search Report—PCT/US08/067387, International Search Authority—European Patent Office, Nov. 12, 2008.

3GPP TS 23.402 v1.0.0 (May 2007), 3rd Generation Partnership Project; Technical Specification Group Services and System Aspects; Architecture Enhancements for non-3GPP accesses (Release 8).

3GPP TS 23.401 v1.0.0 (May 2007), 3rd Generation Partnership Project; Technical Specification Group Services and System Aspects; GPRS enhancements for E-UTRAN access (Release 8).

3GPP TS 23.402 v8.0.0 (Dec. 2007), 3rd Generation Partnership Project; Technical Specification Group Services and System Aspects; Architecture Enhancements for non-3GPP accesses (Release 8).

Dorot, V.et al.: "An Explanatory Dictionary of Modern Computer Terms," 2nd Edition, bhv, Saint Petersburg, 2001, 'Program Product' on p. 339.

Translation of Office Action in Russian application 2010101223 corresponding to U.S. Appl. No. 12/140,623, citing Dorot et el p. 339 year 2001, WO2007007990A1, RU2237381, US20060148475, Hyun-Ho Choi et al pp. 1559-1564 year 2007 and QUALCOMM EUROPE S2-071148 year 2007 dated Apr. 19, 2011.

Taiwan Search Report—TW097122778—TIPO—Aug. 26, 2012.

(56) References Cited

OTHER PUBLICATIONS

3GPP: "Optimized Handover Procedures and Protocols between EUTRAN Access and cdma2000 HRPD Acess—Stage 3 (Release 8)" 3rd Generation Partnerschip Project;Technical Specification Group Core Network and Terminals; 3GPP Evolved Packet Systems, Jun. 6, 2008, pp. 1-21, XP002542969, Chapter 1; p. 7 Chapter 4; p. 8 Chapters 7.3-7.3.3; pp. 10-12 Chapter 7.5.6; p. 17.

"3GPP TR 23.882 v1.8.0 3GPP System Architecture Evolution: Report on Technical Options and Conclusions (Release 7)", Feb. 21, 2007, Retrieved from the Internet: http://www.3gpp.org/fpt/Specs/html-info/23882.htm, XP002488584.

3GPP TS 23.402, "3rd Generation Partnership Project; Technical Specification Group Services and System Aspects; Architecture enhancements for non-3GPP accesses (Release 8)", V8.1.1, Mar. 2008, pp. 1-163.

3GPP TS 36.300 V8.0.0 (Mar. 2007); Evolved Universal Terrestrial Radio Access (E-UTRA) and Evolved Universal Terrestrial Radio Access Network (E-UTRAN) (Mar. 31, 2007).

3GPP TS36.300 v0.9.0 Evolved Universal Terrestrial Radio Access (E-UTRA) and Evolved Universal Terrestrial Radio Access Network (E-UTRAN); Overall description; 3GPP Technical Specification Group Radio Access. Network, [Online] Mar. 4, 2007, p. 49.

3GPP TSG-RAN WG2, "Generic approach for optimized non-3GPP handover", S2-073606 (Aug. 31, 2007).

3GPP2: "UMB and HRPD/Ix Interworking, X.50054-610-0 Version 1.0" 3GPP2, [Online] Aug. 29, 2008, pp. 1-60, XP002529917 Retrieved from the Internet: www.3gpp2.org/Public_html/specs / X.S0054-610-0_v1.0_080909.pdf> paragraphs [003.]-[5.1.3.].

"3rd Generation Partnership Project; Technical Specification Group Core Network and Terminals;3GPP System Architecture Evolution ; CT WG1 Aspects(Release 8)" 3GPP Draft; 24801-100, 3rd Generation Partnership Project (3GPP), Mobile Competence Centre ; 650, Route Des Lucioles ; F-06921 Sophia-Antipolis Cedex ; France, vol. CT WG1, No. Zagreb, Croatia; 20080623, May 21, 2008, XP050029410, Chapter 7.3.3.2.1; p. 56 Chapters 9.4.1-9.4.3; pp. 69-70 Chapter 10.4; p. 85 Chapters 10.14.1.1.2-10.14.1.1.3; p. 93.

Dutta, a. et al.: Columbia Univ: "A Framework of Media-Independent Pre-Authentication (MPA); draft-ohba-mobopts-mpa-framework-OO.txt" IETF Standard-Working-Draft, Internet Engineering Task Force, IETF, CH, Feb. 13, 2005, pp. 1-39, XP015039521 ISSN: 0000-0004 paragraphs [4.1.]-[4.3.] paragraph [5.4.].

Ericsson: "PDN GW identification" 3GPP Draft; S2-083275 23.402_CR0263_PDN_GW Identity PA2, 3rd Generation Partnership Project (3GPP), Mobile Competence Centre ; 650, Route Des Lucioles ; F-06921 Sophia-Antipolis Cedex ; France, vol. SA WG2, No. Prague; 20080512, Apr. 30, 2008, XP050265506 Chapters 8.3 and 9.5; pp. 24-29.

Jun Wang, "Access Authentication and Authorization in UMB", May 14, 2007, 3rd Generation Partnership Project 2 "3GPP2", pp. 1-3.

Stamoulis A et al.,"Space-Time Block-Coded Ofdma With Linear Precoding for Multirate Services" IEEE Transactions on Signal Processing, 20020101 IEEE Service Center, New York, NY, US, vol. 50,Nr:1, pp. 119-129, Jan. 2002, XP001200909.

Technical Specification Group Services and System Aspects: "Architecture enhancements for non-3GPP accesses TS 23.402 V8.0.0 (Release 8)" 3GPP-Standards, 2500 Wilson Boulevard, Suite 300, Arlington, Virginia 22201 USA, Dec. 2007, XP040278698 Chapter 4.1.2; p. 12 Chapters 4.3.2-4.3.5.2; pp. 22-24 Chapters 6.2.1-6.3; pp. 54-62 Chapters 8-9.3.2; pp. 82-104 Annex C.5; pp. 124-125.

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8); ETSI TS 136 300" ETSI Standards, LIS, Sophia Antipolis Cedex, France, vol. 3-R2, No. V8.1.0, Jun. 1, 2007, pp. 1-107, XP014038500 ISSN: 0000-0001 paragraph [8.2.] paragraphs [010.]-[10.2.2.].

\* cited by examiner

METHOD AND APPARATUS FOR FAST INTER-SYSTEM HANDOVER

CROSS-REFERENCE

This application claims the benefit of U.S. Provisional Application Ser. No. 60/944,782, filed Jun. 18, 2007, and entitled "METHODS AND APPARATUSES FOR FAST INTER-SYSTEM HANDOVER," the entirety of which is incorporated herein by reference.

BACKGROUND

I. Field

The present disclosure relates generally to wireless communications, and more specifically to techniques for managing handover operations in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A handover procedure can be utilized in wireless communication systems to in the event that a mobile device requires a transfer of communication service from a first network to a second network. As wireless communication technology becomes more advanced, seamless mobility and service continuity between different mobile systems, which can utilize disparate access methods from one another, becomes increasingly important. Seamless mobility between disparately-accessed networks can be facilitated by prepared handover between systems, which is enabled through inter-access system preparation. Various techniques exist for providing handover preparation across systems. For example, inter-access system preparation can be conducted by mobile devices enabled to communicate on two radio technologies simultaneously. However, conducting system preparation in this manner prevents the use of low-cost terminal hardware with multi-mode radio capability. Alternatively, an interface between mobility management entities of disparately-accessed systems can be provided such that a first system can utilize the interface to prepare resources at a second system. However, as this technique requires different radio technologies to be able to communicate with one another, it necessarily requires a complex standardization effort between radio technologies.

Accordingly, there exists a need for techniques for fast inter-system handover in a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for managing a handover in a wireless communication system is described herein. The method can comprise identifying signaling communicated based on a signaling method associated with a target network; establishing a communication link to the target network; and preparing resources for a handover to the target network by providing the identified signaling using the established communication link.

According to another aspect, a wireless communications apparatus is described herein that can comprise a memory that stores data relating to a target system and a radio access protocol associated with the target system. The wireless communications apparatus can further comprise a processor configured to identify one or more messages communicated utilizing the radio access protocol associated with the target system and to prepare resources for a handover to the target system by tunneling the identified messages to the target system.

Yet another aspect relates to an apparatus that facilitates handoff preparation and management in a wireless communication system. The apparatus can comprise means for receiving signaling based on an access method of a target network; means for determining whether communication service is to be transferred to the target network; and means for tunneling the received signaling to the target network to facilitate preparation of resources therein upon a positive determination.

Still another aspect relates to a computer program product, which can comprise a computer-readable medium that comprises code for identifying a first communication protocol; code for identifying a second communication protocol, disparate from the first communication protocol, associated with a network for which communication service is to be transferred; code for receiving signaling formatted according to the second communication protocol; and code for tunneling the received signaling to the network for which communication service is to be established.

An additional aspect relates to an integrated circuit that executes computer-executable instructions for managing a prepared handover. The instructions can comprise identifying one or more Non-Access Stratum (NAS) signaling messages based on an access method associated with a target network; establishing a communication tunnel with the target network; and preparing resources for a handover to the target network by providing the identified NAS signaling messages thereto using the established communication tunnel.

According to another aspect, a method for preparing resources for communication is described herein. The method can comprise establishing a communication link with a source network; receiving relayed signaling initially communicated from the source network via the communication link; and preparing resources for communication based on the received signaling.

According to a further aspect, a wireless communications apparatus is described herein that can comprise a memory that stores data relating to a communication tunnel with a base station and a system access method. The wireless communications apparatus can further comprise a processor configured to receive signaling that utilizes the system access method stored by the memory and is directed to the wireless communications apparatus from the base station over the communication tunnel.

Another aspect relates to an apparatus that facilitates resource preparation for a handover. The apparatus can comprise means for establishing resources for a communication link with a source system; means for receiving information via the source system over the communication link; and means for establishing resources for communication based on the received information.

An additional aspect relates to a computer program product, which can comprise a computer-readable medium that comprises code for establishing resources corresponding to a communication tunnel with a source network in association with a handover of communication service from the source network; code for identifying one or more signaling messages relayed by the source network over the communication tunnel; and code for preparing resources for communication based on the identified signaling messages.

Yet another aspect relates to an integrated circuit that executes computer-executable instructions for preparing a handover of communication service. The instructions can comprise allocating communication resources corresponding to a tunnel with a communication system on an interface therewith; receiving one or more handover preparation messages via the tunnel with the communication system; and preparing resources for a handover from the communication system based on the received messages.

Still another aspect relates to a method for preparing a handover from a first network to a second network. The method can comprise establishing communication with a first network using a first access method; identifying a required change in communication service from the first network to a second network that utilizes a second access method disparate from the first access method; and preparing resources at the second network by communicating signaling to the first network that is based on the second access method and directed to the second network.

According to yet another aspect, a wireless communications apparatus is described herein that can comprise a memory that stores data relating to a first system, a first radio access method utilized by the first system, a second system, and a second radio access method utilized by the second system. The wireless communications apparatus can further comprise a processor configured to identify a required handover from the first system to the second system and to prepare resources for the handover to the second system by communicating handover preparation signaling to the first system that utilizes the second radio access method and is directed to the second system.

According to still another aspect, an apparatus that facilitates inter-access system preparation for a handover is described herein. The apparatus can comprise means for communicating with a source system using a first communication method; means for identifying a target system using a second communication method; and means for preparing resources for a change in communication service from the source system to the target system by providing setup information directed to the second system and utilizing the second communication method to the first system.

An additional aspect relates to a computer program product, which can comprise a computer-readable medium that comprises code for identifying a required handoff from a source communication network to a target communication network and an access type utilized by the target communication network; and code for preparing resources at the target communication network by providing setup information that is directed to the target communication network and utilizes the access type utilized by the target communication network to the source communication network.

A further aspect relates to an integrated circuit that executes computer-executable instructions for handover preparation in a wireless communication system. The instructions can comprise establishing communication with a first system; identifying a second system and a communication protocol associated with the second system; and preparing resources at the second system for a handover thereto by tunneling signaling to the first system using the communication protocol associated with the second system.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
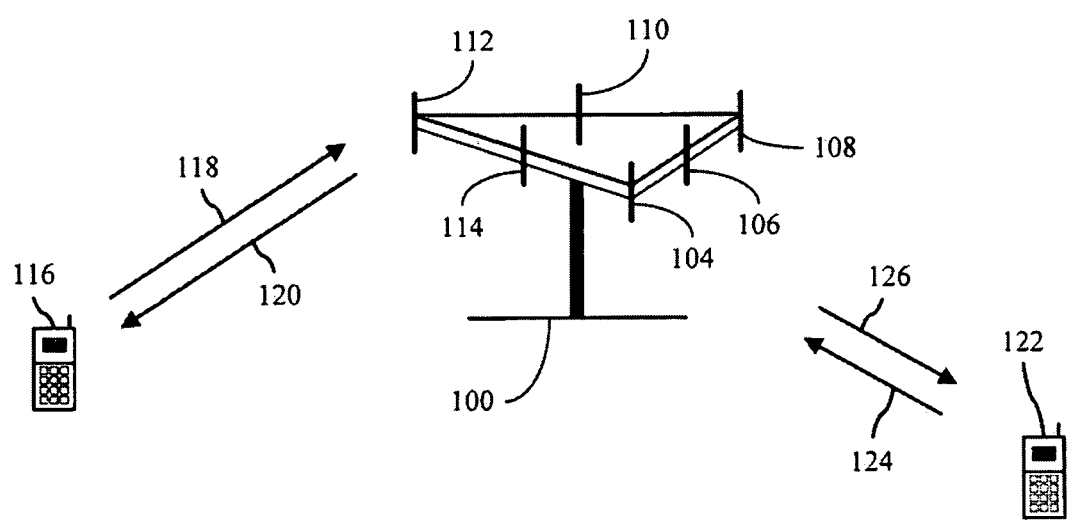
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
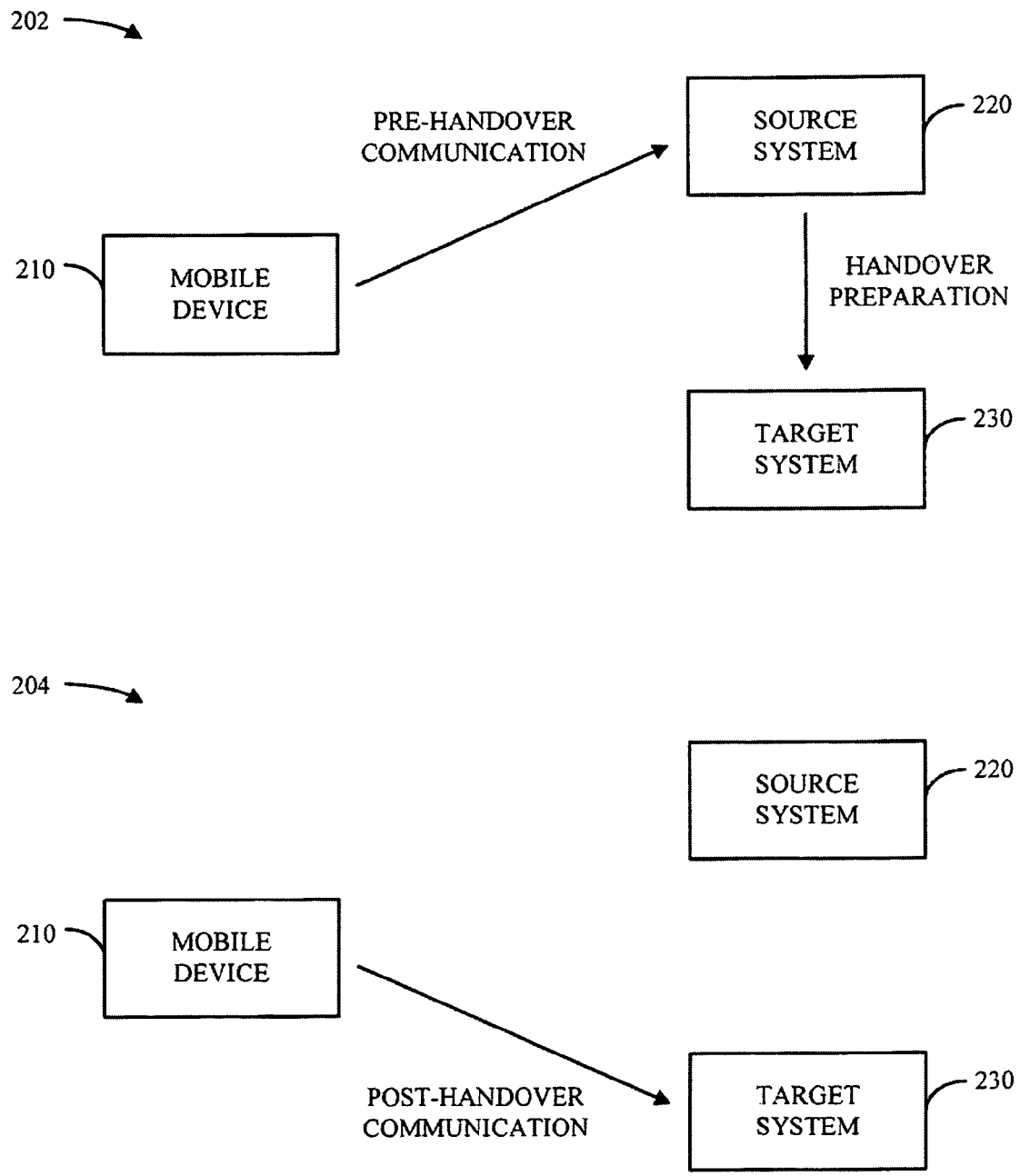
FIG. 2 is a block diagram that illustrates an example prepared handover operation in a wireless communication system in accordance with various aspects.

FIG. 2 is a block diagram that illustrates an example prepared handover operation in a wireless communication system in accordance with various aspects described herein. In one example, a handover can be conducted to transfer communication service for a mobile device 210 from a source system 220 to a target system 230, as illustrated by diagrams 202 and 204. Further, source system 220 and target system 230 can utilize the same radio access technology or different technologies.

In accordance with one aspect, in the event that source system 220 and target system 230 utilize different radio technologies, inter-access system handover from source system 220 to target system 230 can be conducted without inter-access system preparation (e.g., basic handover) or with inter-access system preparation (e.g., prepared handover). A non-limiting example of a prepared handover from source system 220 to target system is illustrated by diagrams 202 and 204.

Diagram 202 illustrates communication in an example wireless communication system prior to a handover from source system 220 to target system 230 in accordance with one aspect. As shown in diagram 202, a mobile device 210 for which the handover is to be conducted can conduct pre-handover communication with source system 220. Further, source system 220 can communicate information for handover preparation to target system 230. While not illustrated in diagram 202, it should be appreciated that mobile device 210 can additionally and/or alternatively provide handover preparation information directly to target system 230. Upon handover preparation, handover can be conducted from source system 220 to target system 230 such that mobile device 210 can conduct post-handover communication with target system 230 as illustrated in diagram 204.

Various techniques exist for inter-access handover preparation of a target system 230. As a first example, a mobile device 210 can be provided with "dual radio" capabilities such that, for example, the mobile device 210 is able to communicate with the source system 220 and target system 230 simultaneously. In such an example, the mobile device 210 can prepare authentication, authorization, and accounting (AAA) functions, setup of resources, and/or other aspects of a handover for a target system 230 utilizing the radio interface of the target system 230 before dropping the radio link to the source system 220. In this manner, service interruption time can be minimized upon handing over user sessions from the source network 220 to the target network 230. However, because this approach relies on dual-radio capability for a mobile device 210, it prevents the use of low-cost terminal hardware with multi-mode radio capability.

As another example, an interface can be provided between network infrastructure elements of the two systems 220 and 230 involved in the handover to push information relating to a mobile device 210 and its sessions from the source system 220 to the target system 230. As a result, when the mobile device 210 subsequently drops the radio link with the source system 220 and connects to the target system 230, the target system can already be prepared to continue the sessions of the mobile device 210. This approach is employed, for example, for handover operations between 3GPP second generation (2G) and third generation (3G) legacy systems. However, it can be appreciated that this approach requires nodes of two disparate networks 220 and 230, each of which may utilize a different standard generation and/or technology for communication, to communicate information to each other. Accordingly, such an approach requires a substantial standardization effort between the involved systems 220 and 230 and results in a major design impact on both systems 220 and 230. It can be appreciated that this drawback is even more significant when the two involved systems 220 and 230 are regulated by different standards organizations (e.g., by 3GPP, 3GPP2, WiMAX Forum, IEEE, etc.).

In view of the foregoing, various aspects described herein provide for techniques for fast inter-access handover that mitigate at least the above shortcomings. In accordance with one aspect, handover techniques are provided that enable a target system 230 to be prepared by a mobile device 210 via a source system 220 in order to minimize specific changes required to source system 220 and/or target system 230. Additionally, handover techniques are described that prevent state information specific to the source system 220 from being transferred to the target system 230.

Figure 3:
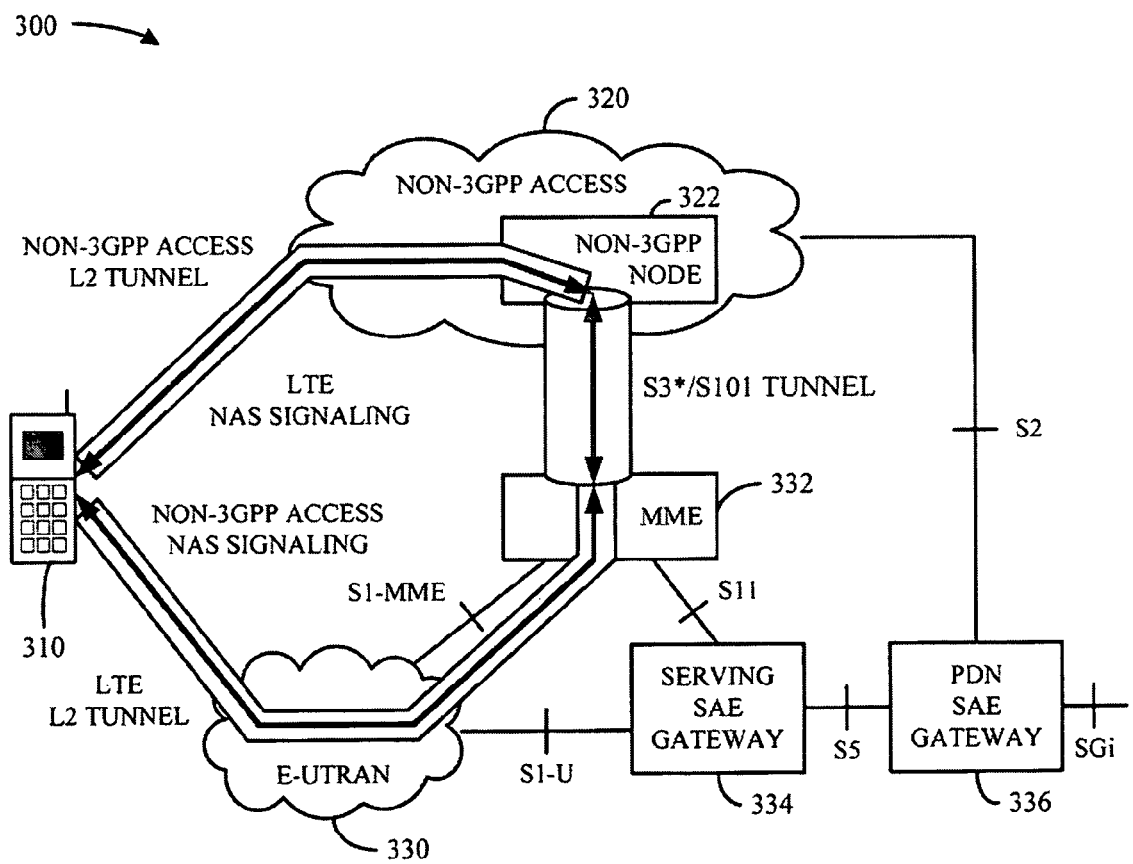
FIGS. 3-5 are block diagrams that illustrate respective systems for fast inter-system handover in a wireless communication system in accordance with various aspects.

FIG. 3 is a block diagram that illustrates an example system 300 for fast inter-access handover in accordance with various aspects described herein. In one example, system 300 can be utilized to provide seamless inter-system handover for a "single radio" mobile terminal 310 (e.g., a terminal capable to communicate and/or to be in an active state with a single radio system at a time). In accordance with one aspect, system 300 utilizes the radio link of a source system for a handover operation to "tunnel" signaling messages which are in the format understood by a destination node in the target system. For example, the signaling messages can be transmitted in a format that would be utilized for sending the messages directly to the target system.

In the example illustrated by system 300, a handover operation can be conducted between an Evolved Universal Terrestrial Radio Access Network (E-UTRAN) 330 based on LTE access technology and a non-3GPP access system 320 (e.g., a 3GGP2 High-Rate Packet Data (HRPD) system). It should be appreciated that system 300 can facilitate a handover operation from the E-UTRAN 330 to the non-3GPP access system 320 or vice versa. Further, it should be appreciated that, while an E-UTRAN 330 and a non-3GPP access system 320 are illustrated in system 300, the techniques illustrated by system 300 can be applied to network(s) based on any suitable wireless communication technology.

In accordance with one aspect, system 300 can provide fast inter-access handover by establishing a simple generic transmission tunnel between the network nodes in the two different systems which handle intra-system mobility and providing a Layer 2 (L2) tunneling mechanism over the radio interface of each involved system technology. In the example illustrated by system 300, the generic transmission tunnel can be provided between a Mobility Management Entity (MME) 332 associated with E-UTRAN 330 and a non-3GPP network node 322 (e.g., a cdma2000 base station controller or BSC) at non-3GPP access system 320 over a S3* or S101 reference point. As further illustrated by system 300, E-UTRAN 330, MME 332, and/or non-3GPP access system 320 can additionally communicate with a serving System Architecture Evolution (SAE) gateway 334 and/or a Packet Data Network (PDN) SAE gateway 336 through various interfaces therebetween. In accordance with one aspect, the tunneling mechanisms provided by system 300 for a single-radio terminal 310 can achieve handover performance traditionally associated with dual-radio terminals while minimizing the impact on the two systems 320 and 330 involved in the handover.

In one example, L2 tunneling can be provided within system 300 for delivery of signaling from a mobile terminal 310 directly to a non-3GPP network node 322 in a non-3GPP access system 320, a MME 332 associated with E-UTRAN 330, and/or another suitable network node responsible for mobility within an associated network. Alternatively, L2 tunneling can be provided in multiple segments such that, for example, a first L2 tunnel is utilized to provide signaling between mobile terminal 310 and non-3GPP access system 320 and/or E-UTRAN 330 and a second L2 tunnel is utilized to provide data from a network 320 and/or 330 to a respective network node 322 and/or 332.

Additionally, tunneling between network nodes 322 and 332 over the S3* or S101 reference point can be conducted in various manners. For example, handover preparation information for a target system can be provided from mobile terminal 310 to a source system. The source system can then relay the handover preparation information to the target system over the S3* or S101 tunnel using a specifically-constructed protocol that is independent of radio access technologies utilized by the source and/or target systems. Alternatively, mobile terminal 310 can communicate handover preparation information for a target system to a source system as user data, which can then be relayed to the target system by the source system utilizing IP connectivity provided by the source system.

In accordance with one aspect, system 300 can be utilized to facilitate inter-access handover for a single-radio terminal that achieves handover performance in terms of delay that is approximately the same as that for dual-radio terminals. In addition, it can be appreciated that the handover techniques illustrated by system 300 require only support for generic transmission tunnels. These tunnels include, for example, L2 tunnels between a mobile terminal 310 and mobility management entity(ies) 322 and/or 332 in the corresponding network infrastructure (e.g., a BSC in a 3GPP2 HRPD system, a Serving Generic Packet Radio Service (GPRS) Support Node (SGSN) SGSN in 3GPP legacy systems for 3GPP Release 8 (Rel-8) or pre-Rel-8, a MME in 3GPP Rel-8, etc.) and/or a generic IP packet transport tunnel between the corresponding mobility management entities of the two involved systems.

Figure 4:
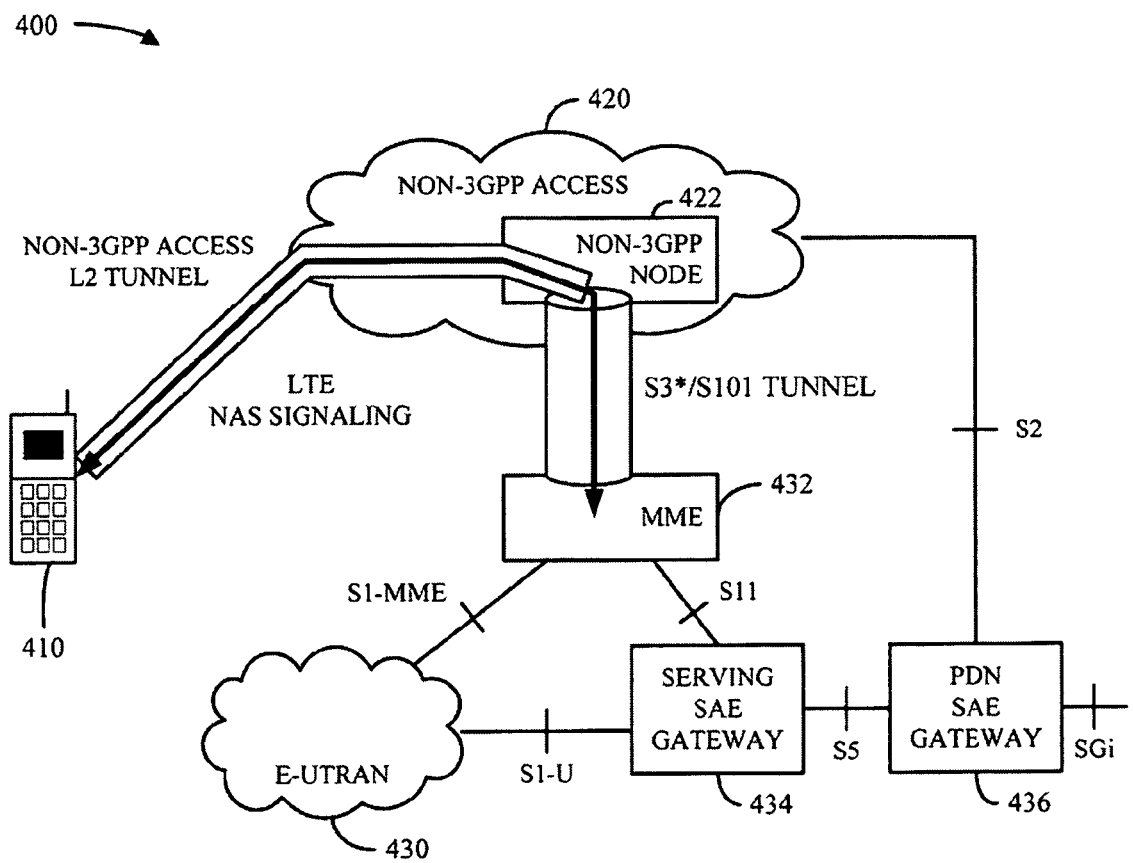

With reference now to FIG. 4, a diagram of a system 400 is provided that illustrates example resource preparation initiated by a UE 410 for a handover from a non-3GPP access system 420 to an E-UTRAN 430. As illustrated by system 400, when UE 410 is connected with a non-3GPP radio access system 420 and handover preparation toward an E-UTRAN 430 is triggered, LTE Non-Access Stratum (NAS) signaling messages can be exchanged between UE 410 and an MME 432 associated with E-UTRAN 430 via a non-3GPP L2 tunnel from UE 410 to non-3GPP access system 420 and a S3* or S101 tunnel from a non-3GPP network node 422 at non-3GPP access system 420 to MME 432. In one example, L2 tunneling can be conducted directly from UE 410 to network node 422 or as a series of L2 tunnels from UE 410 to non-3GPP access system 420 and from non-3GPP access system 420 to network node 422. In accordance with one aspect, NAS signaling messages are transparently transported by non-3GPP access system 420 toward E-UTRAN 430. For example, non-3GPP access system 420 is not required to interpret messages directed to E-UTRAN 430, thereby limiting the impact to either system 420 or 430. As FIG. 4 further illustrates, handover can be further facilitated by a serving SAE gateway 434 and/or a PDN SAE gateway 436.

Figure 5:
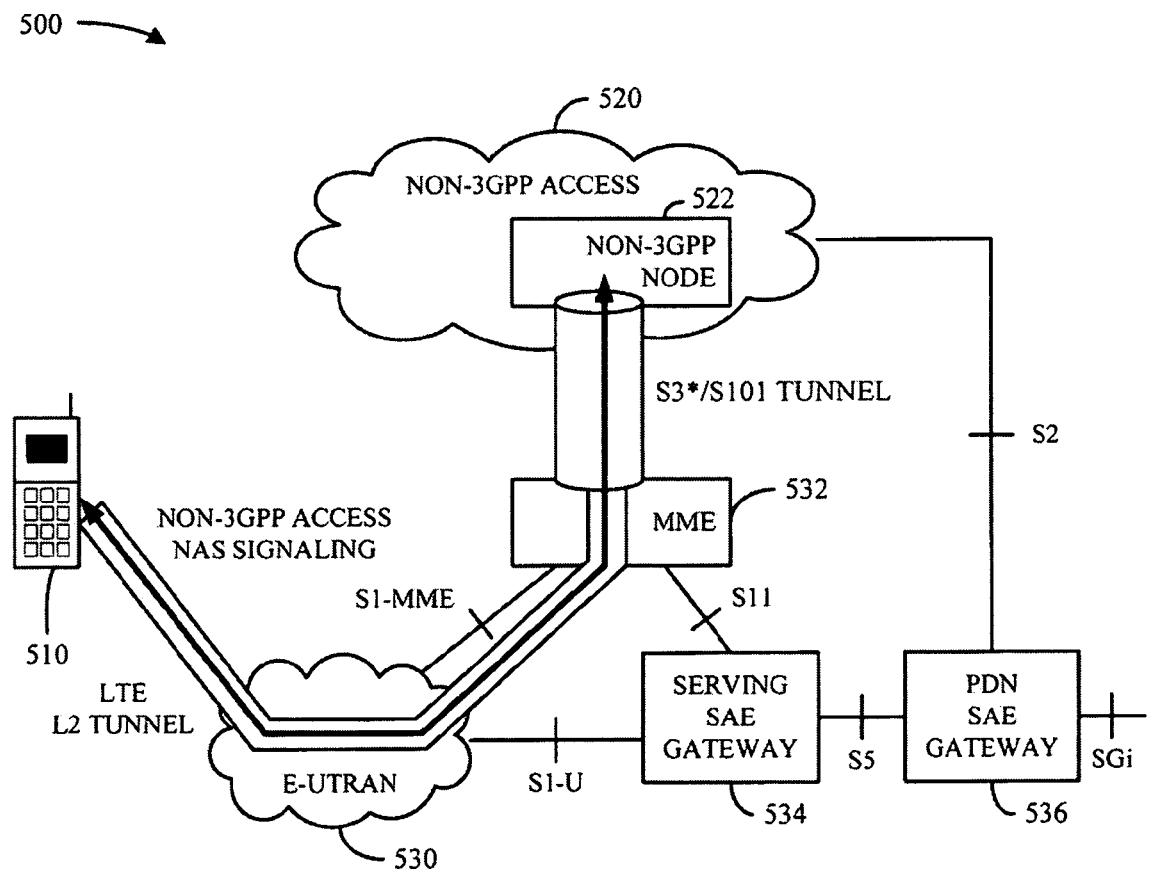

Similarly, a diagram of a system 500 is provided in FIG. 5 that illustrates example resource preparation initiated by a UE 510 for a handover from an E-UTRAN 530 to a non-3GPP access system 520. As system 500 illustrates, when UE 510 is connected to an Evolved Packet System (EPS) via E-UTRAN 530 and handover preparation to a non-3GPP access system 520 is triggered, non-3GPP signaling messages can be exchanged between UE 510 and a network node 522 serving as a S3* termination point in non-3GPP system 520 via an LTE L2 tunnel and an MME 552 associated with E-UTRAN 530. In one example, L2 tunneling can be conducted directly from UE 510 to MME 532 or as a series of L2 tunnels from UE 410 to E-TRAN 530 and from E-UTRAN 530 to MME 532. In accordance with one aspect, signaling messages are transparently transported by E-UTRAN 530 toward non-3GPP system 520. For example, E-UTRAN 530 is not required to interpret messages directed to non-3GPP system 520, thereby limiting the impact to either system 520 or 530. As system 500 further illustrates, handover can be further facilitated by a serving SAE gateway 534 and/or a PDN SAE gateway 536.

Figure 6:
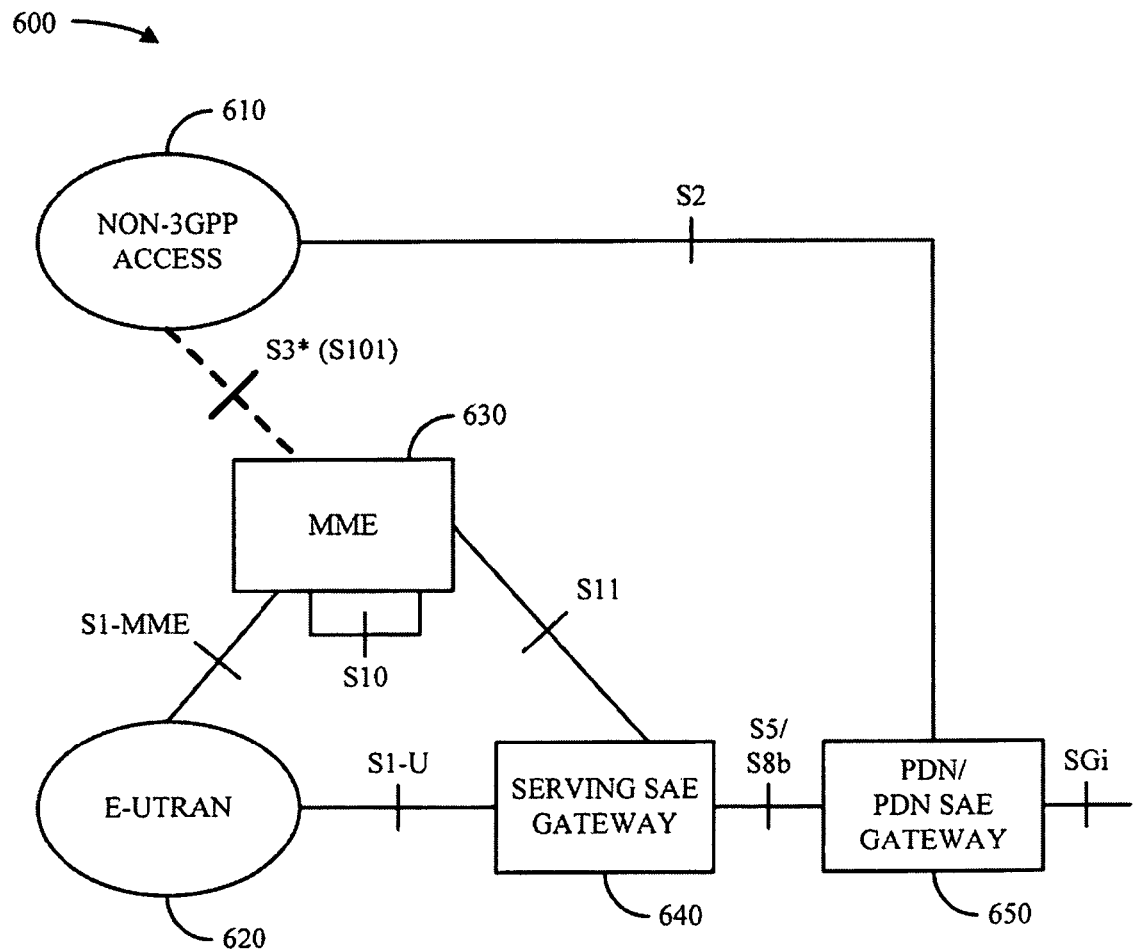
FIG. 6 illustrates an example network architecture that can be utilized to facilitate inter-access handover in accordance with various aspects.

FIG. 6 illustrates an example network architecture 600 that can be utilized to facilitate inter-access handover in accordance with various aspects. In one example, resource preparation for a handover between a non-3GPP access system 610 and an E-UTRAN 620 or vice versa can be accomplished by employing a logical interface between the systems 610 and 620. It can be appreciated that for intra-3GPP inter-Radio Access Technology (RAT) handover, such an interface can be represented by a reference point S3 between an MME at a first system and a SGSN at a second system. Similarly, as illustrated by system 600, handover preparation can be carried out over an additional reference point established between an MME 630 associated with E-UTRAN 620 and a trusted non-3GPP access system 610. In one example, this reference point can be denoted as S3* in view of its correspondence with the conventional reference point S3 between an MME and SGSN. Alternatively, the reference point between MME 630 and non-3GPP access system 610 can be denoted by S101 and/or by any other appropriate nomenclature.

In accordance with one aspect, various network entities can additionally and/or alternatively communicate with each other over a set of reference points therebetween. For example, as illustrated by system 600, non-3GPP access system 610 can communicate signaling for control and/or mobility support with a PDN and/or PDN SAE gateway 650 over an S2 reference point. In another example, MME 630 can communicate with a serving SAE gateway over an S11 reference point. In turn serving SAE gateway 640 can communicate with a PDN 650 over an S8b reference point (in the case of a roaming architecture) or with a PSN SAE gateway 650 over a S5 reference point (in the case of a non-roaming architecture). PDN and/or PDN SAE gateway 650 can additionally and/or alternatively communicate with one or more external packet data networks via a SGi reference point.

Figure 7:
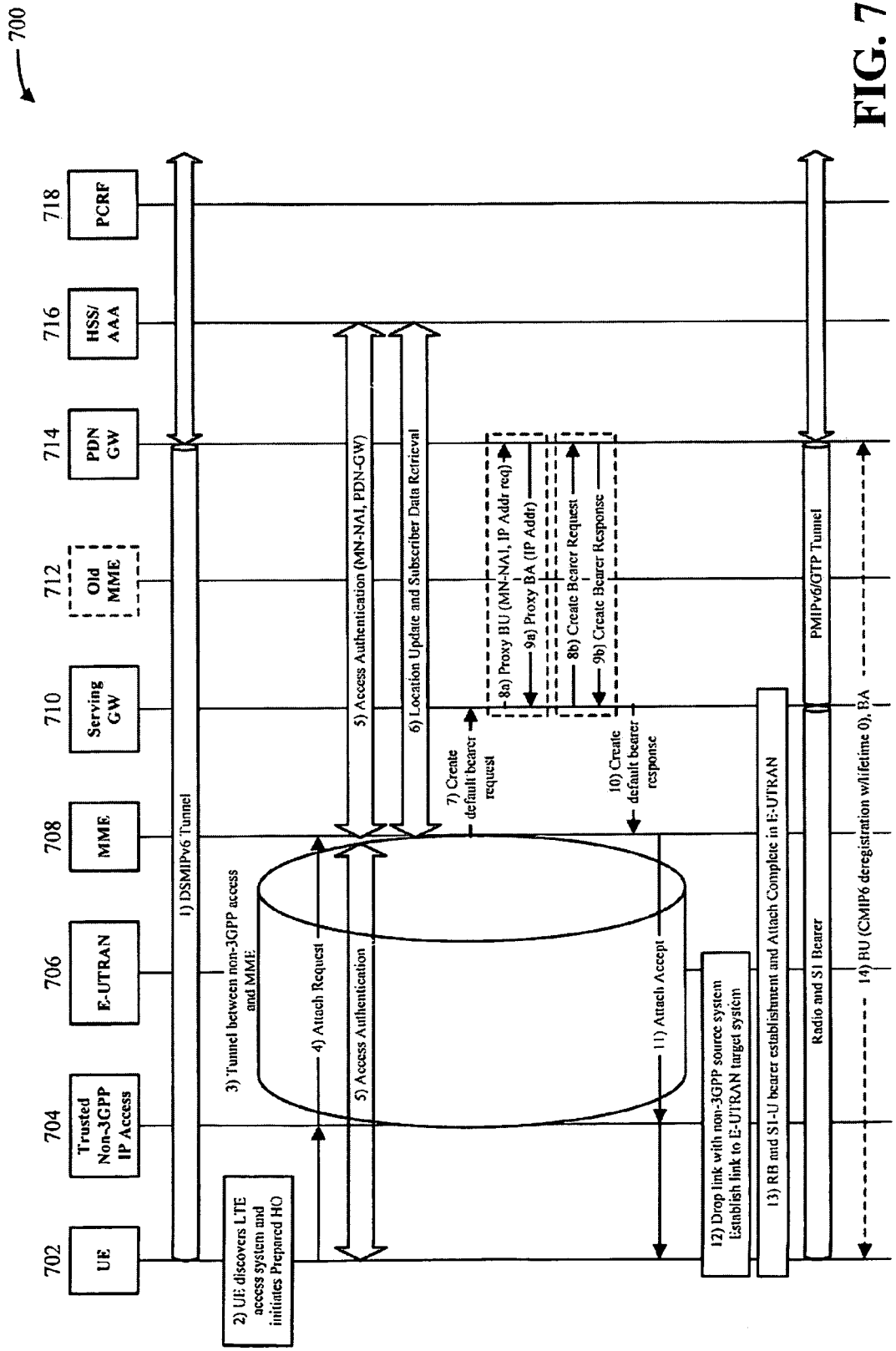
FIGS. 7-8 illustrate respective example handover procedures that can be performed in a wireless communication system in accordance with various aspects.

FIG. 7 is a diagram 700 that illustrates an example handover procedure that can be performed in a wireless communication system in accordance with various aspects. More particularly, diagram 700 illustrates a prepared handover from trusted non-3GPP IP access with Dual Stack Mobile IP Version 6 (DSMIPv6) over an S2c reference point to 3GPP access in a non-roaming scenario. It should be appreciated, however, that diagram 700 is provided by way of specific example and is not intended to limit the scope of the hereto appended claims.

In accordance with one aspect, a communication session illustrated by diagram 700 begins in a trusted in a trusted non-3GPP access system (e.g., a 3GPP2 HRPD system) using DSMIPv6 in a non-roaming scenario. Subsequently, the session hands over to a 3GPP access system by means of a prepared handover. Accordingly, at time 1 on diagram 700, a UE 702 utilizes a trusted non-3GPP access system 704. In addition, the UE 702 has a DSMIPv6 session with a PDN GW 714. Next, at time 2, the UE 702 discovers a 3GPP access system and initiates a prepared handover from the currently used trusted non-3GPP access system 704 to the discovered 3GPP access system.

Upon initiation of the prepared handover at time 2, a tunnel between the non-3GPP access system 704 and an MME 708 associated with the 3GPP access system is created or otherwise identified over a S3* or other suitable reference point at time 3. Next, at time 4, the UE 702 sends an Attach Request message over non-3GPP access system 704, which is subsequently routed via the tunnel to the MME 708. At time 5, the MME 708 then contacts the home subscriber server (HSS)/3GPP AAA 716 and authenticates the UE 702. In one example, as part of the authentication procedure, the IP address of the PDN GW 714 that needs to be used in 3GPP access is conveyed to the MME 708. Following successful authentication, the MME 708 performs a location update procedure with HSS 716 at time 6. Next, at time 7, the MME 708 selects a Serving GW 710 and sends a Create Default Bearer Request (including an International Mobile Subscriber Identity (IMSI), a MME Context ID, and a PDN GW IP address) to the selected Serving GW 710.

Following the Create Default Bearer Request at time 7, operation at times 8 and 9 can vary depending on system implementation. For example, for an Internet Engineering Task Force (IETF) implementation, the Serving GW 710 initiates the PMIPv6 registration procedure towards the PDN GW 714 at time 8 by sending a Proxy Binding Update (BU). In one example, if the Network Access Identifier (NAI) of the UE 702 is not provided in the location update procedure at time 6, the Serving GW 710 can derive it at time 8. At time 9, the PDN GW 714 can then respond with a Proxy Binding Acknowledgement (Ack) and update its mobility binding, which effectively switches the DSMIPv6 tunnel from the non-3GPP access network 704 to the PMIPv6 tunnel to the Serving GW 710. In the proxy Binding Ack (BA), the PDN GW 714 can include the same IP address or prefix that was assigned to the UE 702 earlier. Alternatively, for a GPRS Tunneling Protocol (GTP) implementation, the Serving GW 710 can provide a Create Bearer Request message to the PDN GW 714 at time 8. Subsequently, the PDN GW 714 can respond at time 9 with a Create Bearer Response message to the Serving GW 710. In one example, the Create Bearer Response contains the same IP address or prefix that was assigned to the UE 702 earlier.

Following the acts performed at times 8 and 9, the Serving GW 710 can return a Create Default Bearer Response message to the MME 708 at time 10. In one example, this message can also include the IP address of the UE 702. Further, this message can serve as an indication to the MME 708 that the binding has been successful. Next, at time 11, the MME 708 sends an Attach Accept message to UE 702 through the non-3GPP access system 704. At time 12, the UE 702 then drops the link with the non-3GPP access system 704 and establishes a link with the E-UTRAN target access system 706. At time 13, the 3GPP access system can then initiate a radio bearer setup procedure. In response, the 3GPP access system can provide an Attach Complete message. Upon completing the acts described at time 13, handover completes. Following handover, the UE 702 can optionally additionally send a BU to the PDN GW 714 at time 14 to de-register its DSMIPv6 binding that was created while the UE 702 was in the non-3GPP access system 704.

Figure 8:
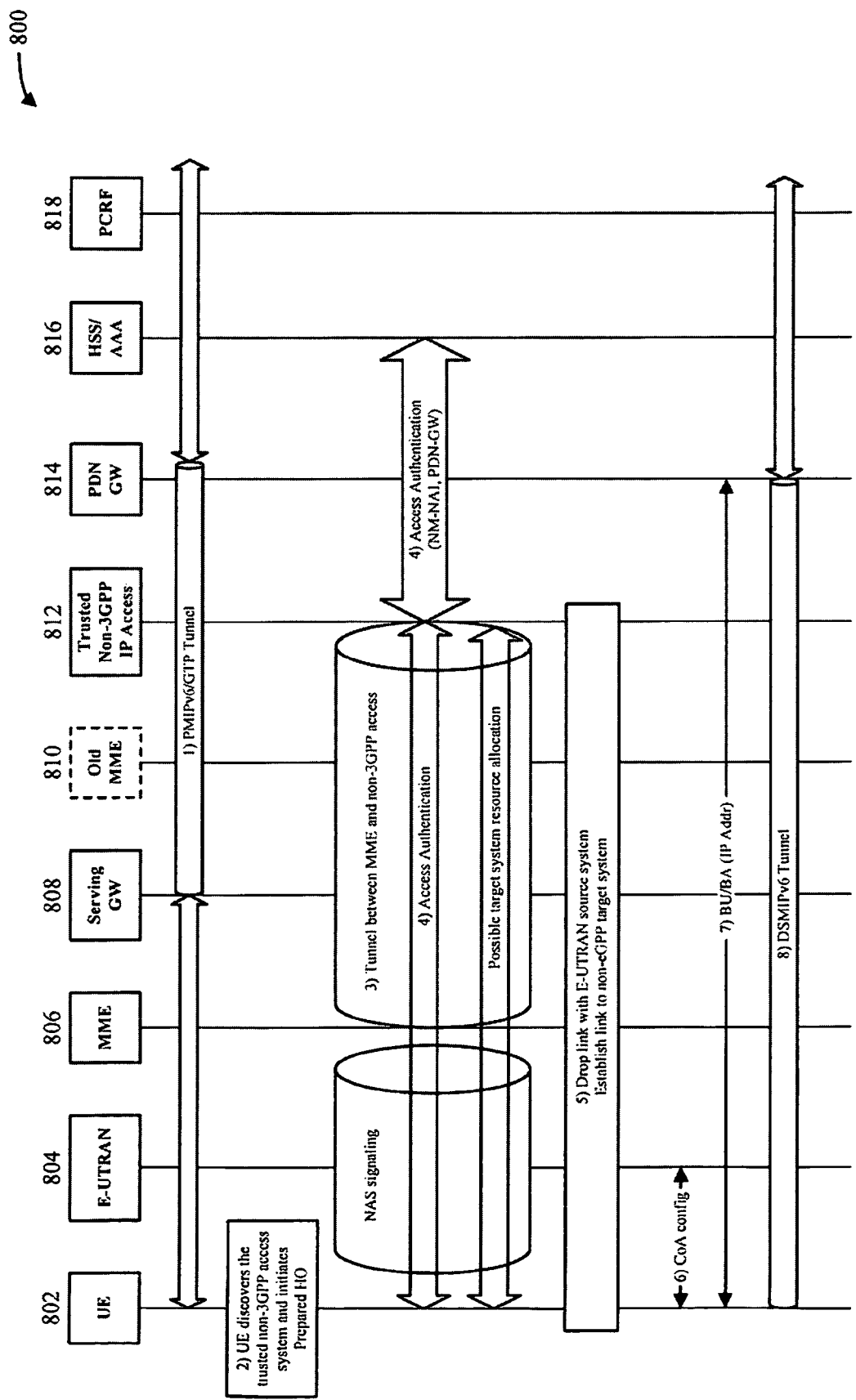

FIG. 8 is a diagram 800 that illustrates another example handover procedure that can be performed in a wireless communication system in accordance with various aspects. More particularly, diagram 800 illustrates a prepared handover from 3GPP access to trusted non-3GPP IP access with DSMIPv6 over an S2c reference point in a non-roaming scenario. It should be appreciated, however, that diagram 800 is provided by way of specific example and is not intended to limit the scope of the hereto appended claims.

In accordance with one aspect, a communication session illustrated by diagram 800 begins in a trusted in a 3GPP access system (e.g., E-UTRAN 804) using Proxy Mobile Internet Protocol Version 6 (MIPv6) or GTP over an S5 reference point. Alternatively, no S5 reference point is utilized by the communication session (e.g., if a Serving GW 808 and a PDN GW 814 are collocated). The session is then handed over by means of a prepared handover to a trusted non-3GPP access system 812 that does not use PMIPv6, where a UE 802 corresponding to the session receives a different prefix than the one it was using in the 3GPP access system. The UE 802 then subsequently initiates DSMIPv6 with the same PDN GW 814 to maintain the IP session. Accordingly, at time 1, the UE 802 uses a 3GPP access system and has an IP address that is supported over an S5 interface. At time 2, the UE 802 then decides to initiate a non-3GPP access procedure. In one example, the decision at time 2 can be based on various factors, such as local policies of the UE 802 and/or any other suitable factors. In addition, the UE 802 initiates prepared handover to a non-3GPP access system 812 at time 2.

Upon initiation of prepared handoff, a tunnel between the non-3GPP access system 812 and an MME 806 associated with the 3GPP access system at which the UE 802 is located is generated or otherwise identified over a S3* or other suitable reference point. Next, at time 4, the UE 802 performs access authentication and authorization in the non-3GPP access system 812 by sending an Access Authentication message over E-UTRAN 804 and the S3* or other reference point. Subsequently, a 3GPP AAA server 816 can authenticate and authorize the UE 802 for access in the non-3GPP system 812. In addition, the target system 812 can allocate system resources and/or an IP address for the UE 802 at time 4.

At time 5, the UE 802 drops the link with the E-UTRAN source system 804 and establishes a link with the non-3GPP target access system 812. At time 6, it can be determined that the non-3GPP access system 812 is not PMIPv6 capable or otherwise elects not to use PMIPv6. Accordingly, the UE 802 can obtain an IP address that is different from the IP address it was using in the 3GPP access system. Consequentially, the UE 802 can additionally elect at time 6 to initiate DSMIPv6 procedures to maintain its IP sessions. It can be appreciated that if IP address allocation is performed at time 4, the acts described at time 6 can be omitted.

Next, at time 7, the UE 802 can send a DSMIPv6 BU message to the PDN GW 814 to register its care-of address (CoA). The PDN GW 814 can authenticate and authorize the UE 802 and subsequently send back a BA including the IP address (e.g., the home address) the UE 802 was using in the 3GPP access system. Finally, at time 8, the UE 802 can continue IP service using the same IP address.

Figure 9:
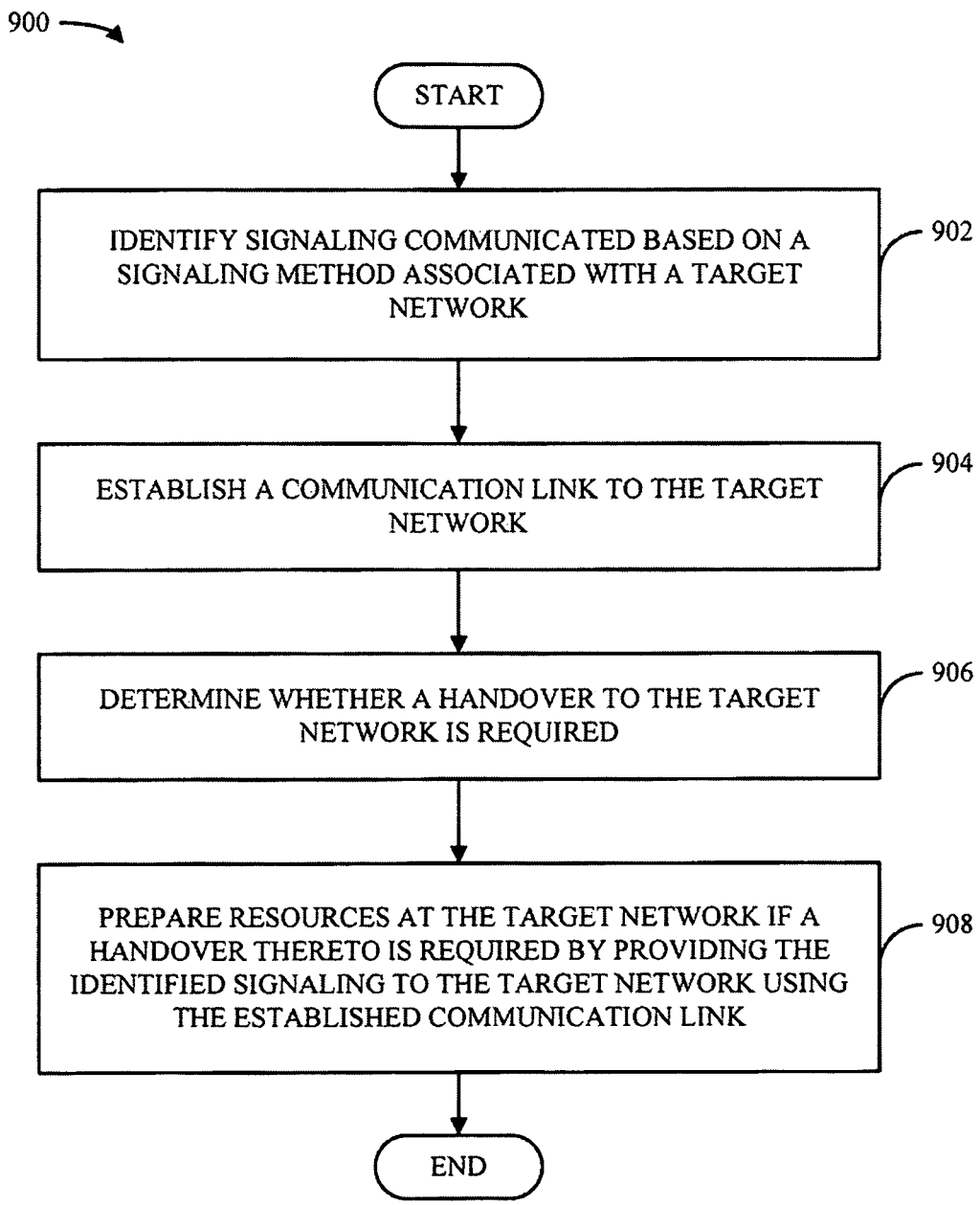
FIGS. 9-11 are flow diagrams of respective methods for performing fast inter-access prepared handover in a wireless communication system.
Figure 10:
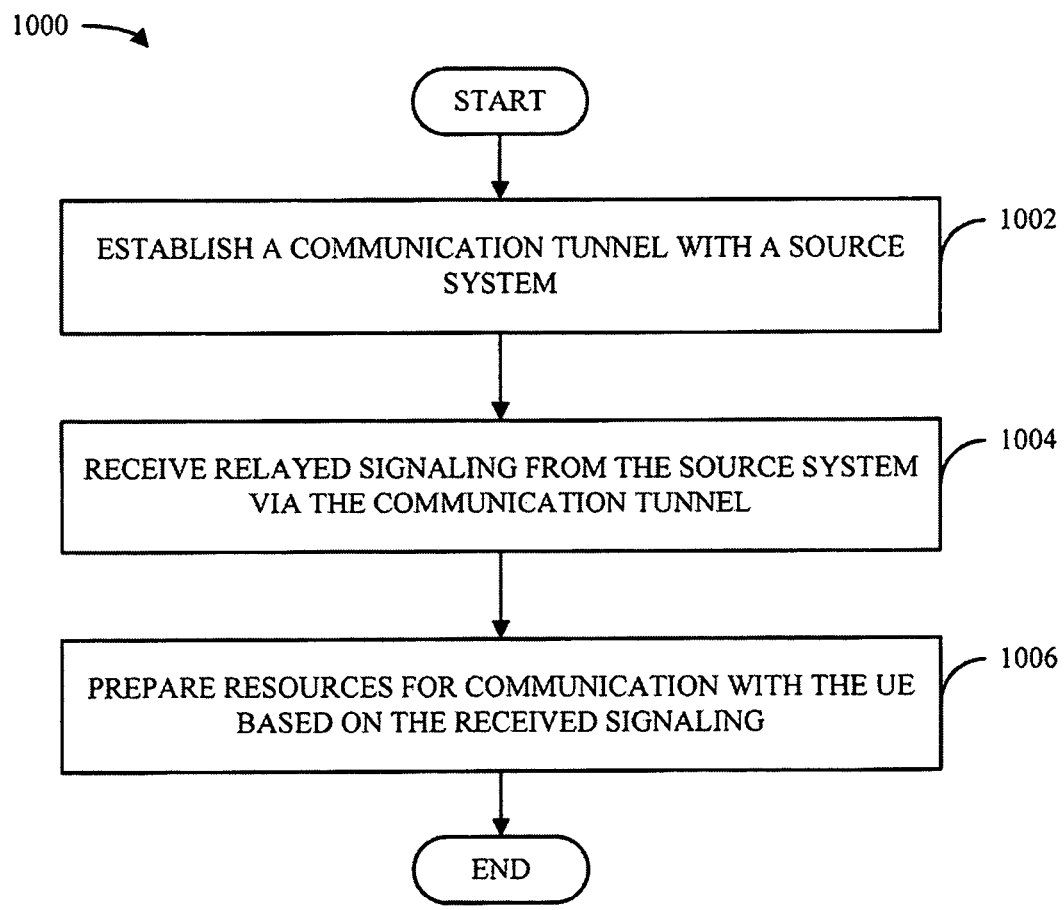
Figure 11:
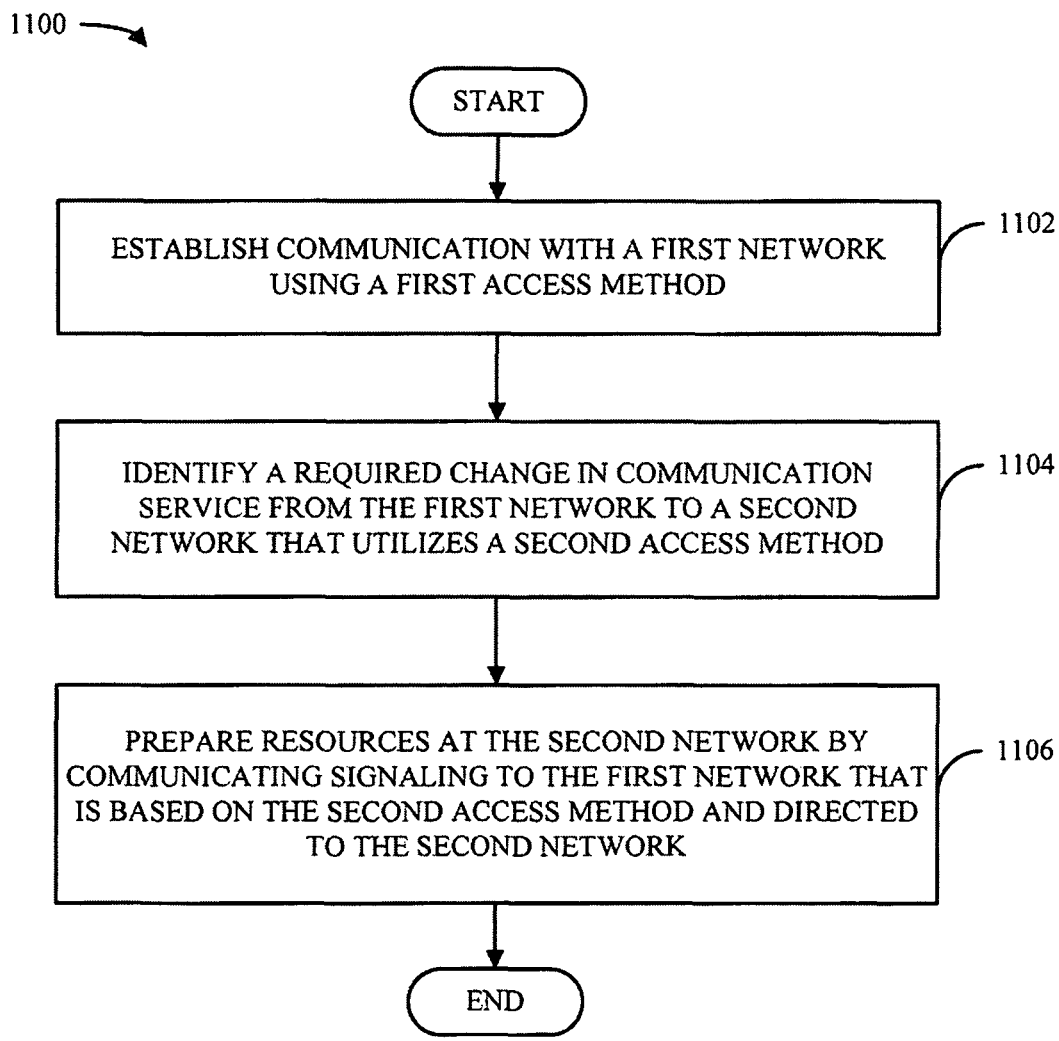

Referring to FIGS. 9-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 9, illustrated is a methodology 900 for managing a handover to a target network in a wireless communication system (e.g., system 200). It is to be appreciated that methodology 900 can be performed by, for example, a wireless communication network (e.g., source network 220) and/or any other appropriate network entity. Methodology 900 begins at block 902, wherein signaling (e.g., signaling communicated from a mobile device 210) based on a signaling method associated with a target network (e.g., target network 230) is identified. In one example, the signaling method utilized for the signaling at block 902 can be based on a radio access technique of the target (e.g., LTE, cdma2000, etc.). The signaling can be communicated as NAS messages, as one or more encapsulated data packets, and/or in any other suitable structure.

Next, at block 904, a communication link to the target network is established. The communication link can be established over a S3* or S101 reference point and/or any other suitable reference point. In one example, the communication link can terminate at an MME and/or another suitable network node at the target network. The communication link can additionally utilize an access-independent protocol; for example, the link can be constructed as a generic IP packet transport tunnel. Methodology 900 can then proceed to block 906, wherein it is determined whether a handoff to the target network is required. In one example, establishment of a communication link to the target network at block 904 can be deferred until a positive determination is reached at block 906.

Methodology 900 can then conclude at block 908, wherein resources are prepared at the target network if a handover thereto is required by providing the signaling identified at block 902 to the target network using the communication link established at block 904. In accordance with one aspect, the signaling can be provided to the target network transparently without requiring interpretation and/or other processing of the signaling to be performed beforehand. In one example, if signaling is identified at block 902 as one or more data packets, the signaling can be provided to the target network at block 908 using an IP transport protocol.

FIG. 10 illustrates a methodology 1000 for preparing resources for a handoff operation in a wireless communication system. Methodology 1000 can be performed by, for example, a wireless communication network (e.g., target network 230) and/or any other appropriate network entity. Methodology 1000 begins at block 1002, wherein a communication tunnel is established with a source system. In accordance with one aspect, the communication tunnel can be based on an access-independent protocol. For example, the communication tunnel can be a generic IP transport tunnel from the source system. In another example, the tunnel can be established with an MME and/or another suitable node of the source network.

Next, at block 1004, relayed signaling (e.g., signaling initially communicated by a UE) is received from the source system via the communication tunnel established at block 1002. In one example, relayed signaling received at block 1004 can be based on a radio access technology utilized by an entity performing methodology 1000 notwithstanding a radio access technology employed by the source system. Methodology 1000 can then conclude at block 1006, wherein resources for communication are prepared based on the signaling received at block 1004.

FIG. 11 is a flow diagram that illustrates a methodology 1100 for preparing a handover from a first network (e.g., source network 220) to a second network (e.g., target network 230). It is to be appreciated that methodology 1100 can be performed by, for example, a mobile terminal (e.g., mobile device 210) and/or any other appropriate network entity. Methodology 1100 begins at block 1102, wherein communication is established with a first network using a first access method. Next, at block 1104, a required change in communication service from the first network to a second network that utilizes a second access method is identified. In one example, the first and second access methods can be disparate from one another. For example, the first access method can be based on non-3GPP access and the second access method can be based on 3GPP LTE, or vice versa.

Methodology 1100 can then conclude at block 1106, wherein resources are prepared at the second network by communicating signaling to the first network that is based on the second access method and is directed to the second network. In one example, communication at block 1106 can be conducted by providing signaling to an MME at the first network for subsequent forwarding to the second network. In another example, signaling can be communicated using one or more L2 tunnels. Signaling can additionally and/or alternatively be encapsulated as data packets prior to communication to facilitate forwarding of the signaling using a generic IP packet transport technique.

Figure 12:
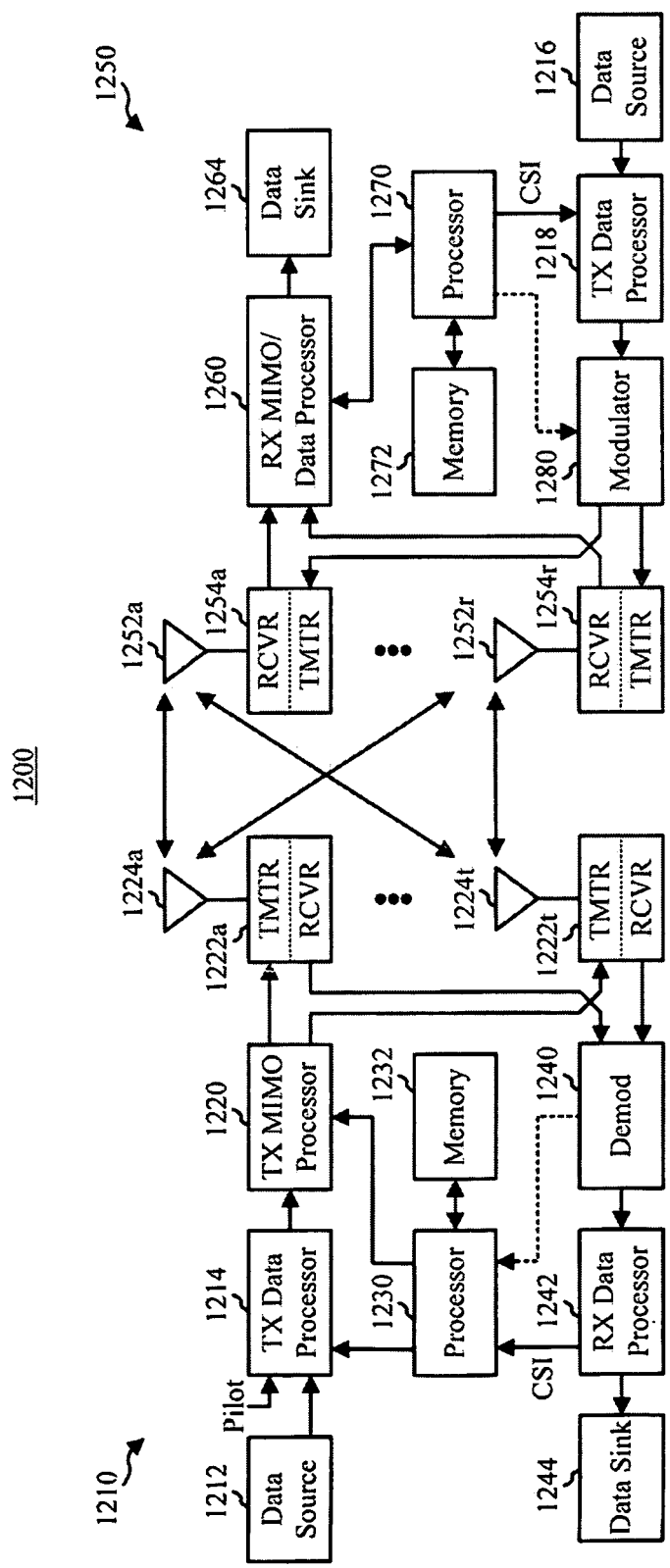
FIG. 12 is a block diagram illustrating an example wireless communication system in which various aspects described herein can function.

Referring now to FIG. 12, a block diagram illustrating an example wireless communication system 1200 in which various aspects described herein can function is provided. In one example, system 1200 is a multiple-input multiple-output (MIMO) system that includes a transmitter system 1210 and a receiver system 1250. It should be appreciated, however, that transmitter system 1210 and/or receiver system 1250 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1210 and/or receiver system 1250 described herein could be utilized in connection with a single output to single input antenna system.

In accordance with one aspect, traffic data for a number of data streams are provided at transmitter system 1210 from a data source 1212 to a transmit (TX) data processor 1214. In one example, each data stream can then be transmitted via a respective transmit antenna 1224. Additionally, TX data processor 1214 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1250 to estimate channel response. Back at transmitter system 1210, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1230.

Next, modulation symbols for all data streams can be provided to a TX processor 1220, which can further process the modulation symbols (e.g., for OFDM). TX MIMO processor 1220 can then provides $N_T$ modulation symbol streams to $N_T$ transceivers 1222a through 1222t. In one example, each transceiver 1222 can receive and process a respective symbol stream to provide one or more analog signals. Each transceiver 1222 can then further condition (e.g., amplify, filter, and upconvert) the analog signals to provide a modulated signal suitable for transmission over a MIMO channel. Accordingly, $N_T$ modulated signals from transceivers 1222a through 1222t can then be transmitted from $N_T$ antennas 1224a through 1224t, respectively.

In accordance with another aspect, the transmitted modulated signals can be received at receiver system 1250 by $N_R$ antennas 1252a through 1252r. The received signal from each antenna 1252 can then be provided to respective transceivers 1254. In one example, each transceiver 1254 can condition (e.g., filter, amplify, and downconvert) a respective received signal, digitize the conditioned signal to provide samples, and then processes the samples to provide a corresponding "received" symbol stream. An RX MIMO/data processor 1260 can then receive and process the $N_R$ received symbol streams from $N_T$ transceivers 1254 based on a particular receiver processing technique to provide $N_T$ "detected" symbol streams. In one example, each detected symbol stream can include symbols that are estimates of the modulation symbols transmitted for the corresponding data stream. RX processor 1260 can then process each symbol stream at least in part by demodulating, deinterleaving, and decoding each detected symbol stream to recover traffic data for a corresponding data stream. Thus, the processing by RX processor 1260 can be complementary to that performed by TX MIMO processor 1220 and TX data processor 1214 at transmitter system 1210. RX processor 1260 can additionally provide processed symbol streams to a data sink 1264.

In accordance with one aspect, the channel response estimate generated by RX processor 1260 can be used to perform space/time processing at the receiver, adjust power levels, change modulation rates or schemes, and/or other appropriate actions. Additionally, RX processor 1260 can further estimate channel characteristics such as, for example, signal-to-noise-and-interference ratios (SNRs) of the detected symbol streams. RX processor 1260 can then provide estimated channel characteristics to a processor 1270. In one example, RX processor 1260 and/or processor 1270 can further derive an estimate of the "operating" SNR for the system. Processor 1270 can then provide channel state information (CSI), which can comprise information regarding the communication link and/or the received data stream. This information can include, for example, the operating SNR. The CSI can then be processed by a TX data processor 1218, modulated by a modulator 1280, conditioned by transceivers 1254a through 1254r, and transmitted back to transmitter system 1210. In addition, a data source 1216 at receiver system 1250 can provide additional data to be processed by TX data processor 1218.

Back at transmitter system 1210, the modulated signals from receiver system 1250 can then be received by antennas 1224, conditioned by transceivers 1222, demodulated by a demodulator 1240, and processed by a RX data processor 1242 to recover the CSI reported by receiver system 1250. In one example, the reported CSI can then be provided to processor 1230 and used to determine data rates as well as coding and modulation schemes to be used for one or more data streams. The determined coding and modulation schemes can then be provided to transceivers 1222 for quantization and/or use in later transmissions to receiver system 1250. Additionally and/or alternatively, the reported CSI can be used by processor 1230 to generate various controls for TX data processor 1214 and TX MIMO processor 1220. In another example, CSI and/or other information processed by RX data processor 1242 can be provided to a data sink 1244.

In one example, processor 1230 at transmitter system 1210 and processor 1270 at receiver system 1250 direct operation at their respective systems. Additionally, memory 1232 at transmitter system 1210 and memory 1272 at receiver system 1250 can provide storage for program codes and data used by processors 1230 and 1270, respectively. Further, at receiver system 1250, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 13:
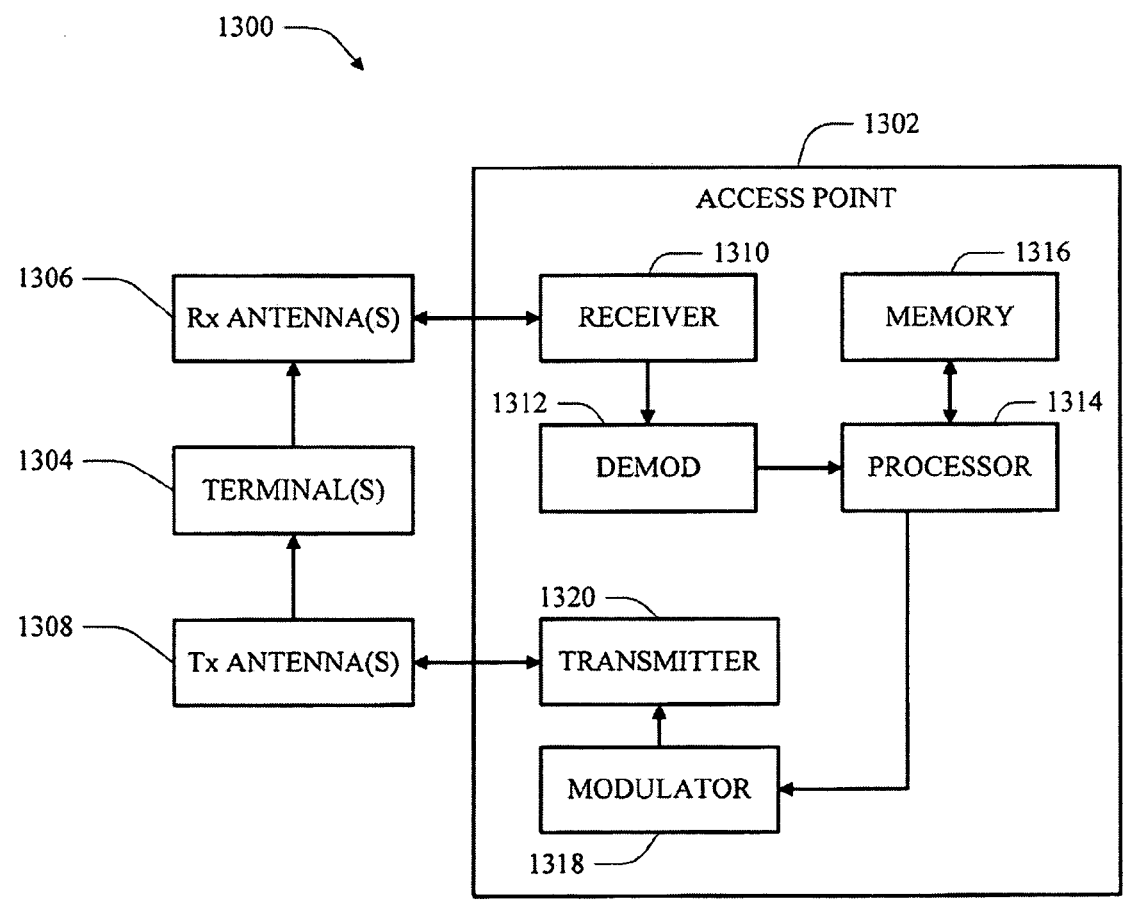
FIGS. 13-14 are block diagrams illustrating example wireless devices that can be operable to implement various aspects described herein.

FIG. 13 is a block diagram of a system 1300 that facilitates management of a handoff operation in a wireless communication system in accordance with various aspects described herein. In one example, system 1300 includes a base station or access point 1302. As illustrated, access point 1302 can receive signal(s) from one or more access terminals 1304 via one or more receive (Rx) antennas 1306 and transmit to the one or more access terminals 1304 via one or more transmit (Tx) antennas 1308.

Additionally, access point 1302 can comprise a receiver 1310 that receives information from receive antenna(s) 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. In one example, access point 1302 can employ processor 1314 to perform methodologies 900, 1000, and/or other similar and appropriate methodologies. Access point 1302 can also include a modulator 1318 that can multiplex a signal for transmission by a transmitter 1320 through transmit antenna(s) 1308.

Figure 14:
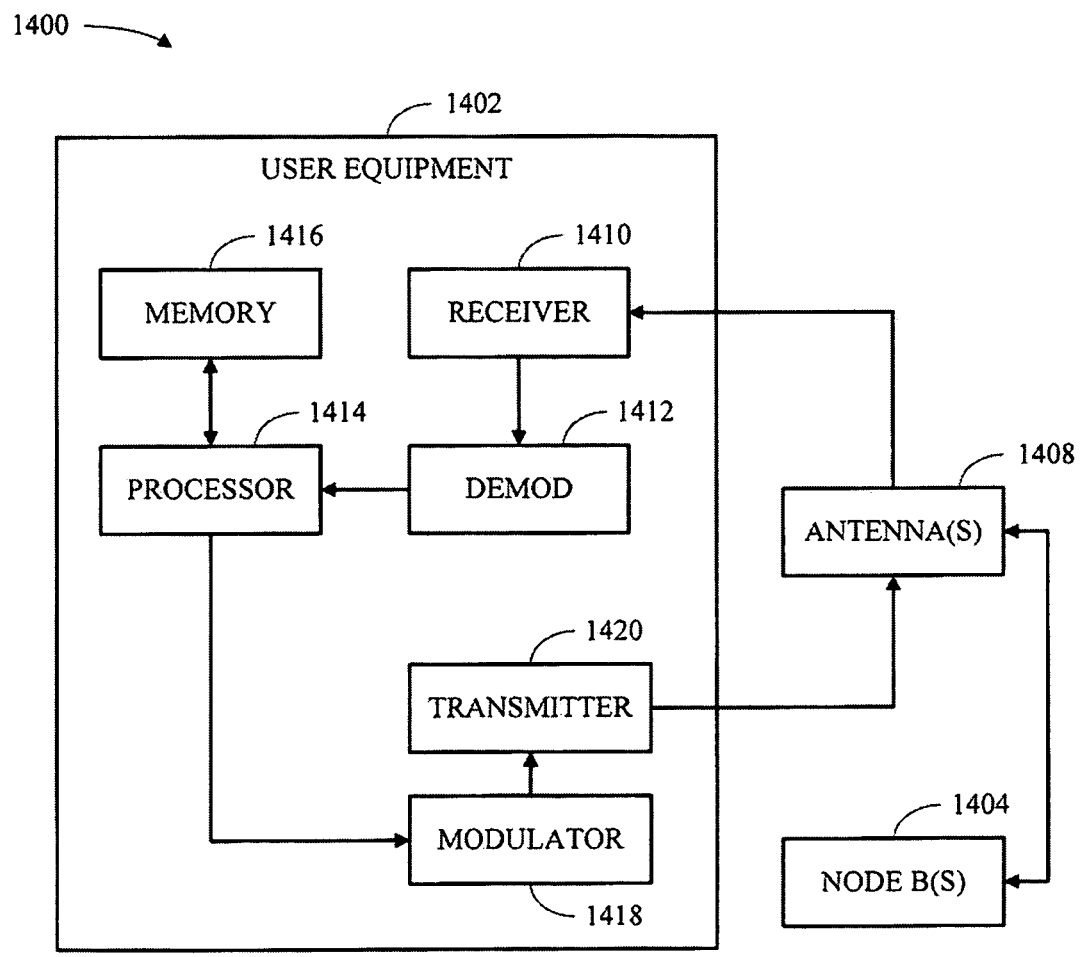

FIG. 14 is a block diagram of an additional system 1400 that facilitates management of a handover in a wireless communication system in accordance with various aspects described herein. In one example, system 1400 includes a terminal or user equipment (UE) 1402. As illustrated, UE 1402 can receive signal(s) from one or more Node Bs 1404 and transmit to the one or more Node Bs 1404 via one or more antennas 1408. Additionally, UE 1402 can comprise a receiver 1410 that receives information from antenna(s) 1408. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to UE 1402. Additionally, UE 1402 can employ processor 1414 to perform methodology 1100 and/or other similar and appropriate methodologies. UE 1402 can also include a modulator 1418 that can multiplex a signal for transmission by a transmitter 1420 through antenna(s) 1408.

Figure 15:
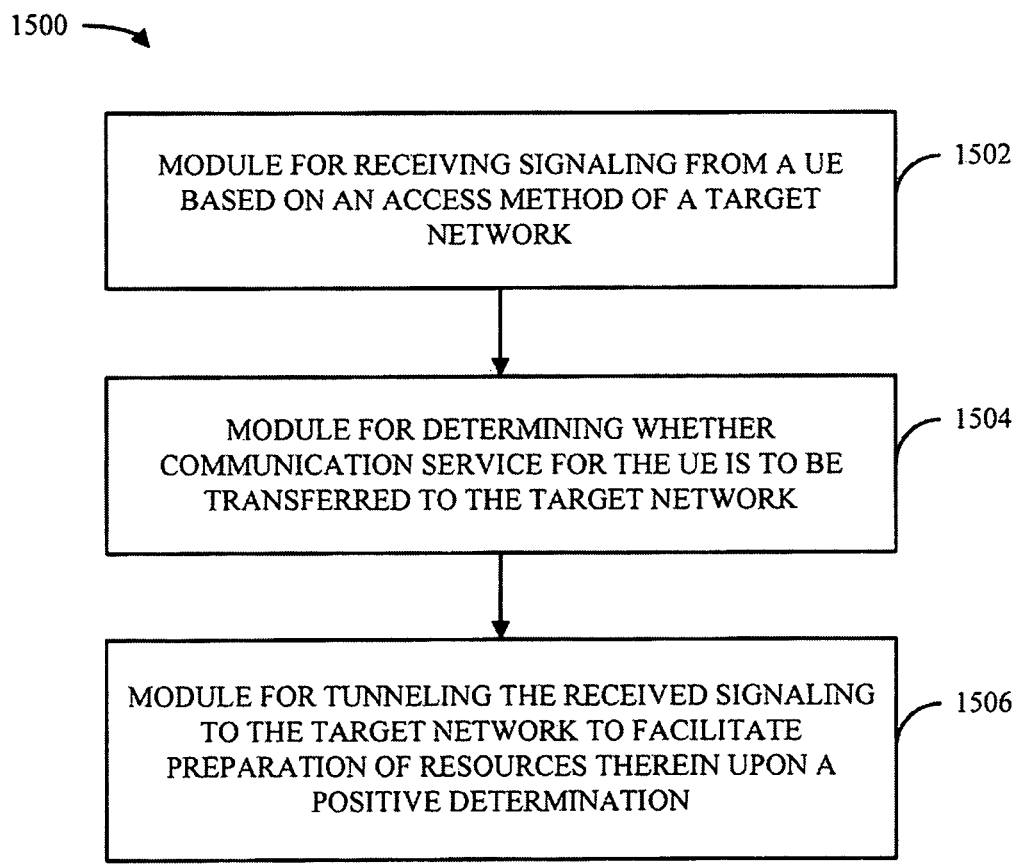
FIGS. 15-17 are block diagrams of respective apparatuses that facilitate fast inter-network handover in a wireless communication system.

FIG. 15 illustrates an apparatus 1500 that facilitates handoff preparation and management in a wireless communication system (e.g., system 200). It is to be appreciated that apparatus 1500 is represented as including functional blocks, which can be functional blocks that represent functions implemented by a processor, software, or combination thereof (e.g., firmware). Apparatus 1500 can be implemented in an access point (e.g., source system 220) and/or any other appropriate network entity and can include a module 1502 for receiving signaling from a UE based on an access method of a target network, a module 1504 for determining whether communication service for the UE is to be transferred to the target network, and a module 1506 for tunneling the received signaling to the target network to facilitate preparation of resources therein upon a positive determination.

Figure 16:
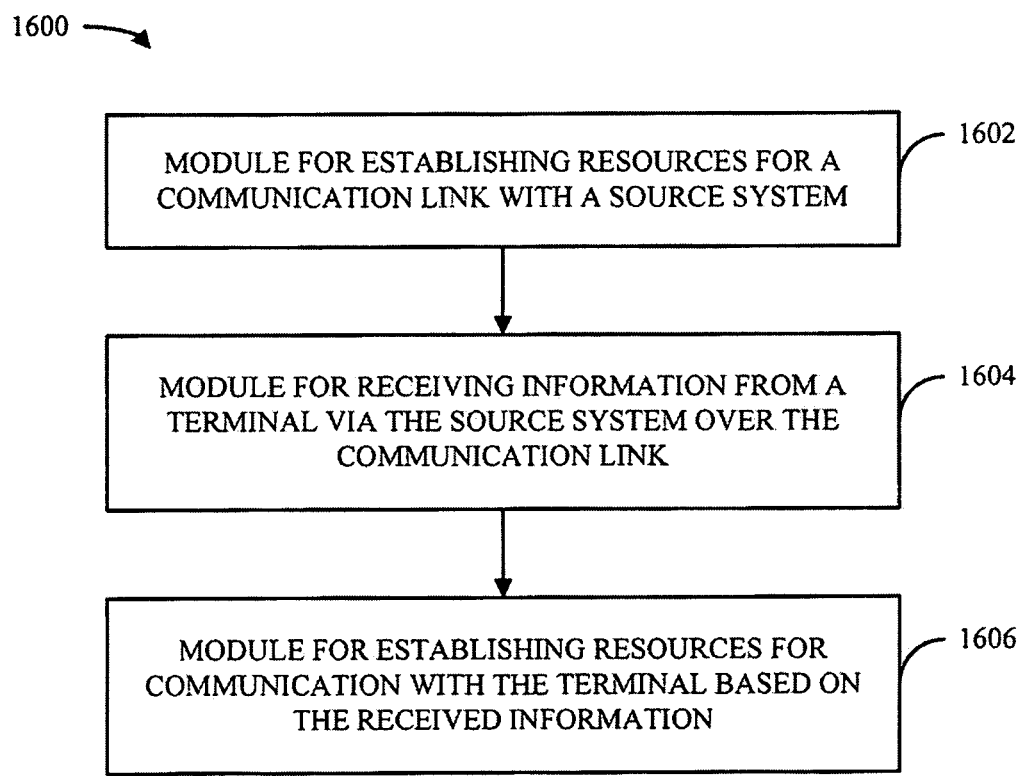

FIG. 16 illustrates an apparatus 1600 that facilitates resource preparation for a handover from a source system. It is to be appreciated that apparatus 1600 is represented as including functional blocks, which can be functional blocks that represent functions implemented by a processor, software, or combination thereof (e.g., firmware). Apparatus 1600 can be implemented in an access point (e.g., target system 230) and/or any other appropriate network entity and can include a module 1602 for establishing resources for a communication link with a source system, a module 1604 for receiving information from a terminal via the source system over the communication link, and a module 1606 for establishing resources for communication with the terminal based on the received information.

Figure 17:
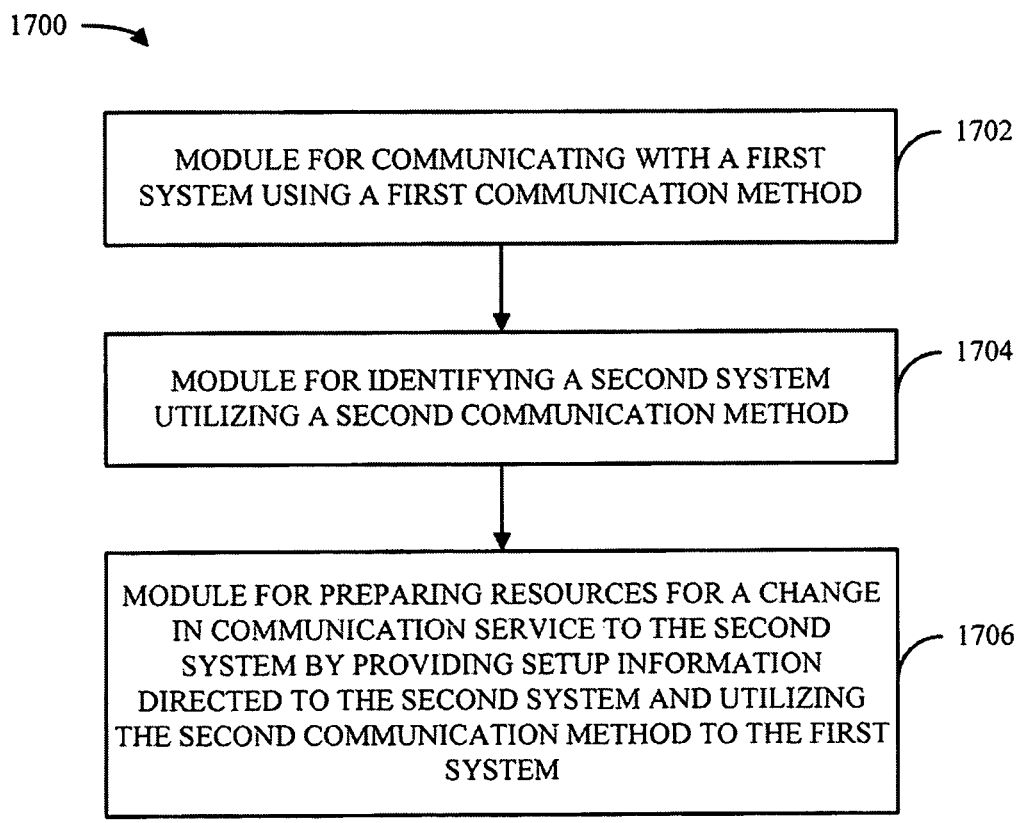

FIG. 17 illustrates an apparatus 1700 that facilitates inter-access system preparation for a handover in a wireless communication system. It is to be appreciated that apparatus 1700 is represented as including functional blocks, which can be functional blocks that represent functions implemented by a processor, software, or combination thereof (e.g., firmware). Apparatus 1700 can be implemented in an access terminal (e.g., mobile device 210) and/or any other appropriate network entity and can include a module 1702 for communicating with a first system using a first communication method, a module 1704 for identifying a second system utilizing a second communication method, and a module 1706 for preparing resources for a change in communication service to the second system by providing setup information directed to the second system and utilizing the second communication method to the first system.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmissions etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of wireless communication, comprising:
    establishing communication by a mobile device with a first system utilizing a first radio access technology;
    identifying by the mobile device a handover of the mobile device from the first system utilizing the first radio access technology to a second system utilizing a second radio access technology disparate from the first radio access technology;
    preparing resources of the second system for the handover of the mobile device to the second system by tunneling handover preparation signaling to the second system via the first system, wherein the tunneling comprises communicating the handover preparation signaling through a Mobile Management Entity (MME) of the first system using a Layer 2 (L2) tunnel, and wherein the handover preparation signaling comprises signaling associated with the second radio access technology and comprising at least a portion of an access authentication procedure within the second system; and
    encapsulating the handover preparation signaling by the mobile device into a number of messages directed to the second system, wherein the encapsulating comprises forming one or more signaling messages associated with the first radio access technology that include information directed to the MME.

2. The method of claim 1, wherein the first system comprises an Evolved Universal Terrestrial Radio Access Network (E-UTRAN).

3. The method of claim 1, further comprising establishing communication with the second system by the mobile device upon completing preparing the resources at the second system.

4. The method of claim 1, further comprising:
    generating access authentication data associated with the mobile device for the second system;
    wherein the handover preparation signaling comprises the access authentication data.

5. The method of claim 1, further comprising:
    identifying a format associated with the second radio access technology; and
    formatting the handover preparation signaling according to the format associated with the second radio access technology.

6. The method of claim 1, wherein the second system comprises a CDMA2000 network.

7. The method of claim 1, further comprising:
    receiving system resource allocation information from the second system over at least the L2 tunnel.

8. The method of claim 1, further comprising:
receiving an IP address for the mobile device on the second system over at least the L2 tunnel.

9. A wireless communications apparatus, comprising:
a memory of a mobile device that stores data relating to a first system, a first radio access technology utilized by the first system, a second system, and a second radio access technology utilized by the second system that is disparate from the first radio access technology; and
a processor of the mobile device configured to:
identify a handover of the mobile device from the first system utilizing the first radio access technology to the second system utilizing the second radio access technology;
prepare resources of the second system for the handover of the mobile device to the second system by tunneling handover preparation signaling to the second system via the first system, wherein the tunneling comprises communicating the handover preparation signaling through a Mobility Management Entity (MME) of the first system using a Layer 2 (L2) tunnel, and wherein the handover preparation signaling comprises signaling associated with the second radio access technology and comprising at least a portion of an access authentication procedure within the second system; and
encapsulate the handover preparation signaling by the mobile device into a number of messages directed to the second system by forming one or more signaling messages associated with the first radio accessing technology that include information directed to the MME.

10. The wireless communications apparatus of claim 9, wherein the processor is further configured to communicate the handover preparation signaling through to the MME in accordance with a generic protocol that is independent of a first protocol of the first radio access technology utilized by the first system and a second the protocol of the second radio access technology utilized by the second system.

11. The wireless communications apparatus of claim 9, wherein the processor is further configured to establish communication with the second system upon preparing resources for the handover thereto.

12. The wireless communications apparatus of claim 9, wherein the processor is further configured to:
generate access authentication data associated with the mobile device for the second system;
wherein the handover preparation signaling comprises the access authentication data.

13. The wireless communications apparatus of claim 9, wherein the processor is further configured to:
identify a format associated with the second radio access technology; and
format the handover preparation signaling according to the format associated with the second radio access technology.

14. The wireless communications apparatus of claim 9, wherein the first system comprises an Evolved Universal Terrestrial Radio Access Network (E-UTRAN).

15. The wireless communications apparatus of claim 9, wherein the second system comprises a CDMA2000 network.

16. The wireless communications apparatus of claim 9, wherein the processor is further configured to:
receive system resource allocation information from the second system over at least the L2 tunnel.

17. The wireless communications apparatus of claim 9, wherein the processor is further configured to:
receive an IP address for the mobile device on the second system over at least the L2 tunnel.

18. An apparatus that facilitates handover of a mobile device, the apparatus comprising:
means for communicating signaling to a first system utilizing a first radio access technology;
means for identifying a second system utilizing a second radio access technology disparate from the first radio access technology;
means for preparing resources of the second system for the handover of the mobile device to the second system by tunneling handover preparation signaling from the mobile device to the second system via the first system, wherein the tunneling comprises communicating the handover preparation signaling through to a Mobility Management Entity (MME) of the first system over a Layer 2 (L2) tunnel, and wherein the handover preparation signaling comprises signaling associated with the second radio access technology and comprising at least a portion of an access authentication procedure within the second system; and
means for encapsulating the handover preparation signaling into a number of messages directed to the second system, wherein the encapsulating comprises forming one or more signaling messages associated with the first radio access technology that include information directed to the MME.

19. The apparatus of claim 18, further comprising:
means for generating access authentication data associated with the mobile device for the second system;
wherein the handover preparation signaling comprises the access authentication data.

20. The apparatus of claim 18, further comprising:
means for identifying a format associated with the second radio access technology; and
means for formatting the handover preparation signaling according to the format associated with the second radio access technology.

21. The apparatus of claim 18, wherein the first system comprises an Evolved Universal Terrestrial Radio Access Network (E-UTRAN).

22. The apparatus of claim 18, wherein the second system comprises a CDMA2000 network.

23. The apparatus of claim 18, further comprising:
means for receiving system resource allocation information from the second system over at least the L2 tunnel.

24. The apparatus of claim 18, further comprising:
means receiving an IP address for the mobile device on the second system over at least the L2 tunnel.

25. A non-transitory computer-readable medium comprising computer-readable program code stored thereon, the computer-readable program code comprising:
code for establishing communication by a mobile device with a first system utilizing a first radio access technology;
code for identifying a handover of a mobile device from the first system utilizing the first radio access technology to a second system utilizing a second radio access technology disparate from the first radio access technology;
code for preparing resources of the second system for the handover of the mobile device to the second system by tunneling handover preparation signaling to the second system via the first system, wherein the tunneling comprises communicating the handover preparation signaling through to a Mobility Management Entity (MME) of the first system using a L2 tunnel, and wherein the handover preparation signaling comprises signaling associated with the second radio access technology and comprising at least a portion of an access authentication procedure within the second system; and code for encapsulating the handover preparation signaling into a number of messages directed to the second system, wherein the encapsulating comprises forming one or more signaling messages associated with the first radio access technology that include information directed to the MME.

26. An integrated circuit adapted for use in a mobile device and configured to execute computer-executable instructions, the instructions comprising:

establishing communication with a first system utilizing a first radio access technology;

identifying a handover of the mobile device from the first system utilizing the first radio access technology to a second system utilizing a second radio access technology disparate from the first radio access technology;

preparing resources of the second system for the handover of the mobile device to the second system by tunneling handover preparation signaling from the mobile device to the second system via the first system, wherein the tunneling comprises communicating the handover preparation signaling through a Mobility Management Entity (MME) of the first system using a Layer 2 (L2) tunnel, and wherein the handover preparation signaling comprises signaling associated with the second radio access technology and comprising at least a portion of an access authentication procedure within the second system; and encapsulating the handover preparation signaling by the mobile device into a number of messages directed to the second system, wherein the encapsulating comprises forming one or more signaling messages associated with the first radio access technology that include information directed to the MME.

\* \* \* \* \*